United States Patent
Kveton et al.

(10) Patent No.: US 11,551,256 B2
(45) Date of Patent: Jan. 10, 2023

(54) MULTIVARIATE DIGITAL CAMPAIGN CONTENT EXPLORATION UTILIZING RANK-1 BEST-ARM IDENTIFICATION

(71) Applicant: Adobe Inc., San Jose, CA (US)

(72) Inventors: Branislav Kveton, San Jose, CA (US); Zheng Wen, Fremont, CA (US); Yasin Abbasi Yadkori, San Francisco, CA (US); Mohammad Ghavamzadeh, San Jose, CA (US); Claire Vernade, Paris (FR)

(73) Assignee: Adobe Inc., San Jose, CA (US)

( * ) Notice: Subject to any disclaimer, the term of this patent is extended or adjusted under 35 U.S.C. 154(b) by 49 days.

(21) Appl. No.: 17/334,237

(22) Filed: May 28, 2021

(65) Prior Publication Data

US 2021/0319470 A1    Oct. 14, 2021

Related U.S. Application Data

(63) Continuation of application No. 15/944,980, filed on Apr. 4, 2018, now Pat. No. 11,062,346.

(51) Int. Cl.
*G06Q 30/02* (2012.01)
(52) U.S. Cl.
CPC ..... *G06Q 30/0242* (2013.01); *G06Q 30/0249* (2013.01)
(58) Field of Classification Search
None
See application file for complete search history.

(56) References Cited

U.S. PATENT DOCUMENTS

| 2008/0281627 | A1* | 11/2008 | Chang | G06Q 30/0277 705/7.39 |
| 2014/0279727 | A1* | 9/2014 | Baraniuk | G09B 7/00 706/11 |
| 2018/0232434 | A1* | 8/2018 | Geyik | G06Q 10/1053 |

OTHER PUBLICATIONS

Katariya et al., "Stochastic Rank-1 Bandits", Mar. 8, 2017, Cornell University arXiv.org, pp. 1-17. (Year: 2017).*
Jean-Yves Audibert and Sébastien Bubeck. Best arm identification in multi-armed bandits. In COLT—23th Conference on Learning Theory—2010, pp. 13-p, 2010.
Sébastien Bubeck, Nicolo Cesa-Bianchi, et al. Regret analysis of stochastic and nonstochastic multi-armed bandit problems. Foundations and Trends in Machine Learning, 5(1):1-122, 2012.

(Continued)

*Primary Examiner* — Christopher B Tokarczyk
(74) *Attorney, Agent, or Firm* — Keller Preece PLLC

(57) ABSTRACT

Methods, systems, and non-transitory computer readable storage media are disclosed for determining parameters for digital campaign content in connection with executing digital campaigns using a rank-one assumption and a best-arm identification algorithm. For example, the disclosed system alternately explores response data in the first dimension and response data in the second dimension using the rank-one assumption and the best-arm identification algorithm to estimate highest sampling values from each dimension. In one or more embodiments, the disclosed system uses the estimated highest sampling values from the first and second dimension to determine a combination with a highest sampling value in a parameter matrix constructed based on the first dimension and the second dimension, and then executes the digital campaign using the determined combination.

20 Claims, 15 Drawing Sheets

(56) References Cited

OTHER PUBLICATIONS

Sébastien Bubeck, Rémi Munos, and Gilles Stoltz. Pure exploration in multi-armed bandits problems. In International conference on Algorithmic learning theory, pp. 23-37. Springer, 2009.

Sébastian Bubeck, Tengyao Wang, and Nitin Viswanathan. Multiple identifications in multiarmed bandits. In International Conference on Machine Learning, pp. 258-265, 2013.

Lijie Chen, Anupam Gupta, and Jian Li. Pure exploration of multi-armed bandit under matroid constraints. arXiv preprint arXiv:1605.07162, 2016.

Shouyuan Chen, Tian Lin, Irwin King, Michael R Lyu, and Wei Chen. Combinatorial pure exploration of multi-armed bandits. In Advances in Neural Information Processing Systems, pp. 379-387, 2014.

Aleksandr Chuklin, Ilya Markov, and Maarten de Rijke. Click Models for Web Search. Morgan & Claypool Publishers, 2015.

Eyal Even-Dar, Shie Mannor, and Yishay Mansour. Pac bounds for multi-armed bandit and markov decision processes. In International Conference on Computational Learning Theory, pp. 255-270. Springer, 2002.

Victor Gabillon, Mohammad Ghavamzadeh, and Alessandro Lazaric. Best arm identification: A unified approach to fixed budget and fixed confidence. In Advances in Neural Information Processing Systems, pp. 3212-3220, 2012.

Victor Gabillon, Alessandro Lazaric, Mohammad Ghavamzadeh, Ronald Ortner, and Peter Bartlett. Improved learning complexity in combinatorial pure exploration bandits. In Proceedings of the 19th International Conference on Artificial Intelligence and Statistics, pp. 1004-1012, 2016.

Aurélien Garivier and Olivier Cappé. The kl-ucb algorithm for bounded stochastic bandits and beyond. In COLT, pp. 359-376, 2011.

Aurélien Garivier and Emilie Kaufmann. Optimal best arm identification with fixed confidence. In Proceedings of the 29th Conference on Learning Theory (to appear), 2016.

Aurélien Garivier, Pierre Ménard, and Gilles Stoltz. Explore first, exploit next: The true shape of regret in bandit problems. arXiv preprint arXiv:1602.07182, 2016.

Shivaram Kalyanakrishnan, Ambuj Tewari, Peter Auer, and Peter Stone. Pac subset selection in stochastic multi-armed bandits. In Proceedings of the 29th International Conference on Machine Learning (ICML-12), pp. 655-662, 2012.

Sumeet Katariya, Branislav Kveton, Csaba Szepesvari, Claire Vernade, and Zheng Wen. Bernoulli rank-1 bandits for click feedback. arXiv preprint arXiv:1703.06513, 2017.

Sumeet Katariya, Branislav Kveton, Csaba Szepesvari, Claire Vernade, and Zheng Wen. Stochastic rank-1 bandits. Proceedings of the 20th International Conference on Artificial Intelligence and Statistics, 2017.

Emilie Kaufmann. Analyse de stratégies bayésiennes et fréquentistes pour l'allocation séquentielle de ressources. PhD thesis, Paris, ENST, 2014.

Emilie Kaufmann, Olivier Cappé, and Aurélien Garivier. On the complexity of best arm identification in multi-armed bandit models. The Journal of Machine Learning Research, 2015.

Emilie Kaufmann and Shivaram Kalyanakrishnan. Information complexity in bandit subset selection. In COLT, pp. 228-251, 2013.

Raghunandan H Keshavan, Andrea Montanari, and Sewoong Oh. Matrix completion from noisy entries. Journal of Machine Learning Research, 11(Jul):2057-2078, 2010.

Paul Lagrée, Claire Vernade, and Olivier Cappé. Multiple-play bandits in the position-based model. In Advances in Neural Information Processing Systems, pp. 1597-1605, 2016.

Tze Leung Lai and Herbert Robbins. Asymptotically efficient adaptive allocation rules. Advances in applied mathematics, 6(1):4-22, 1985.

Shie Mannor and John N Tsitsiklis. The sample complexity of exploration in the multi-armed bandit problem. Journal of Machine Learning Research, 5(Jun):623-648, 2004.

Edward Paulson. A sequential procedure for selecting the population with the largest mean from k normal populations. The Annals of Mathematical Statistics, pp. 174-180, 1964.

Matthew Richardson, Ewa Dominowska, and Robert Ragno. Predicting clicks: Estimating the click-through rate for new ads. In Proceedings of the 16th International Conference on World Wide Web, pp. 521-530, 2007.

Max Simchowitz, Kevin Jamieson, and Benjamin Recht. The simulator: Understanding adaptive sampling in the moderate-confidence regime. arXiv preprint arXiv:1702.05186, 2017.

Yehuda Koren, Robert Bell, and Chris Volinsky. Matrix factorization techniques for recommender systems. Computer, 42(8), 2009.

Daniel Russo. Simple bayesian algorithms for best arm identification. arXiv preprint arXiv:1602.08448, 2016.

U.S. Appl. No. 15/944,980, dated May 28, 2020, Preinterview 1st Office Action.

U.S. Appl. No. 15/944,980, dated Jul. 20, 2020, First Action Office Action.

U.S. Appl. No. 15/944,980, dated Dec. 4, 2020, Office Action.

U.S. Appl. No. 15/944,980, dated Mar. 19, 2021, Notice of Allowance.

* cited by examiner

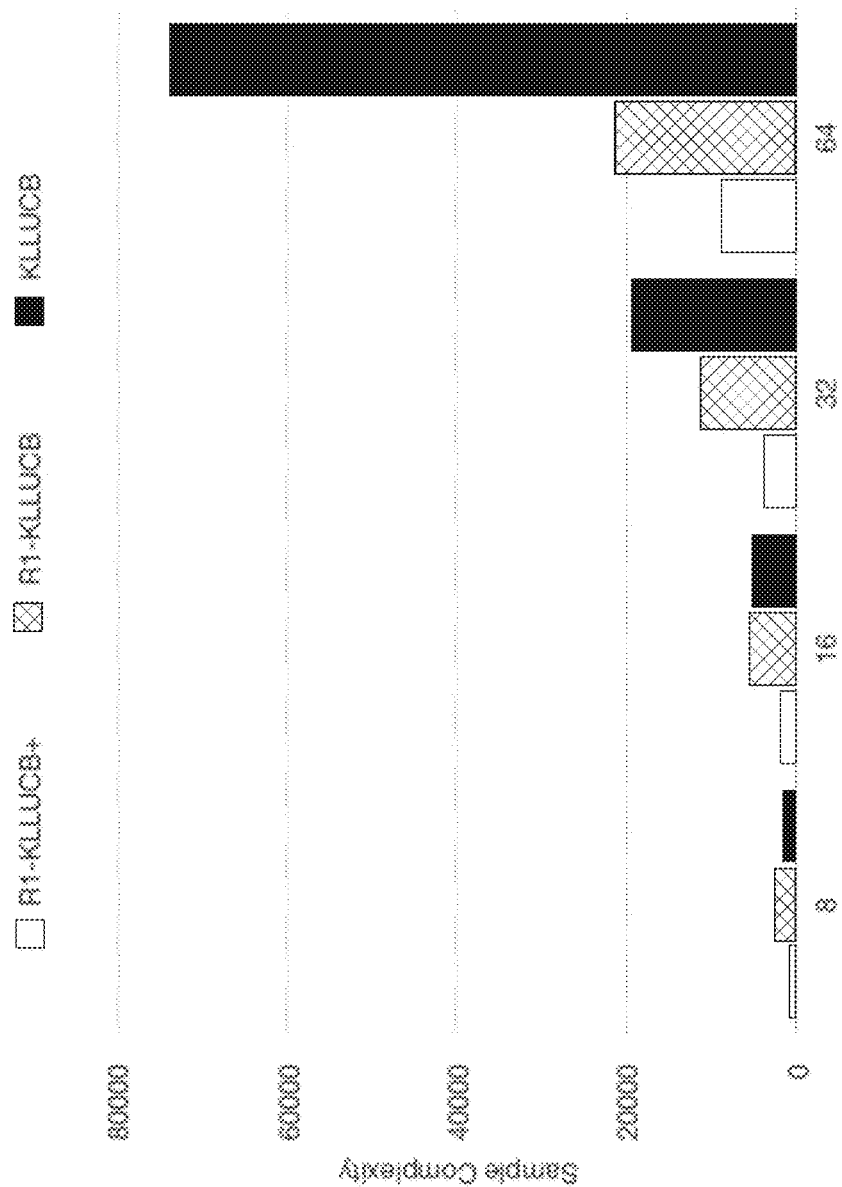

MULTIVARIATE DIGITAL CAMPAIGN CONTENT EXPLORATION UTILIZING RANK-1 BEST-ARM IDENTIFICATION

CROSS-REFERENCE TO RELATED APPLICATIONS

The present application is a continuation of U.S. application Ser. No. 15/944,980, filed on Apr. 4, 2018. The aforementioned application is hereby incorporated by reference in its entirety.

BACKGROUND

Digital campaigns typically require campaigning entities to generate digital content and then provide the digital content to recipients in one or more audience segments. For example, a digital campaign can involve sending emails or digital advertisements with text, images, or other content/parameters to recipients within a given audience segment. A campaigning entity can determine that a campaign is successful based on user responses to the content, such as impressions, click-through rate, or other metrics that measure user engagement with the digital content. Accordingly, entities typically invest significant amounts of time, money, and resources in determining the parameters for the campaigns (e.g., the content to provide to recipients and to which recipients to provide the content) that result in optimal engagement metrics for the campaign.

To determine campaign parameters that result in optimal engagement metrics, some conventional systems test different versions of content and/or different audience segments by utilizing a method commonly referred to as A/B/n testing. Conventionally, A/B/n testing involves determining multiple different versions of a campaign and then testing each of the different versions. For example, an A/B/n test for an email campaign can include sending a small number of different email versions with certain parameters to a small subset of recipients. The conventional systems then use the response data for each of the tests to select a version for wide scale execution of the campaign.

While conventional systems that test each combination of parameters in a campaign are able to determine an adequate combination for wide scale execution, such systems are incapable of scaling to large numbers of possible combinations. Specifically, for large numbers of possible parameter combinations, conventional methods of testing each combination result in an excessive number of tests. For instance, while a campaign with 2 parameters of a first type and 3 parameters of a second type result in 6 different possible combinations (and therefore, 6 different tests), a campaign with 10 parameters of a first type and 20 parameters of a second type would result in 200 different possible combinations. Real world situations can involve tens of thousands of combinations. Accordingly, testing larger and larger numbers of combinations takes increasing amounts of time, making complete A/B/n testing for these scenarios inefficient and unrealistic for most real-world scenarios.

Furthermore, processing and executing complete A/B/n testing in such cases can use large amounts of an entity's computing, networking, and other resources. In particular, to test many different versions of a campaign, an entity must first generate the content for the campaign, which can require content creators (or computing resources) to create the many different versions and store the many different versions. Additionally, testing the many different versions of the campaign uses network resources to send the many different versions to various groups of recipients, while also collecting response data from the many recipients. Thus, not only can the process for testing many different versions be very inefficient and take a long time, the process can also be very resource intensive.

These and other disadvantages exist with respect to conventional campaign testing systems.

SUMMARY

One or more embodiments provide benefits and/or solve one or more of the foregoing or other problems in the art with systems, methods, and non-transitory computer readable storage media for determining parameters for digital campaign content by employing alternating best-arm identification in a plurality of dimensions using assumptions about a structure of a matrix of parameters. For example, the disclosed systems alternately sample parameters for combinations in a first dimension and parameters for combinations in a second dimension to estimate a highest sampling value for each dimension. The disclosed systems then determine a combination of parameters from each parameter set corresponding to the different dimensions in which the combination that includes a high predicted value based on an assumption that a matrix of parameters is a rank-one matrix. Moreover, the disclosed systems can execute the digital campaign by generating and providing digital content using the determined combination with the high predicted value. The disclosed systems can thus execute a digital campaign with an estimated best combination quickly and efficiently without being required to test every possible combination. In this manner, the disclosed systems can increase accuracy, improve flexibility, and increase efficiency relative to conventional systems.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 6A-6B illustrate graph diagrams of analysis on synthetic data using a plurality of best-arm identification algorithms in according with one or more embodiment;

DETAILED DESCRIPTION

Figure 1:
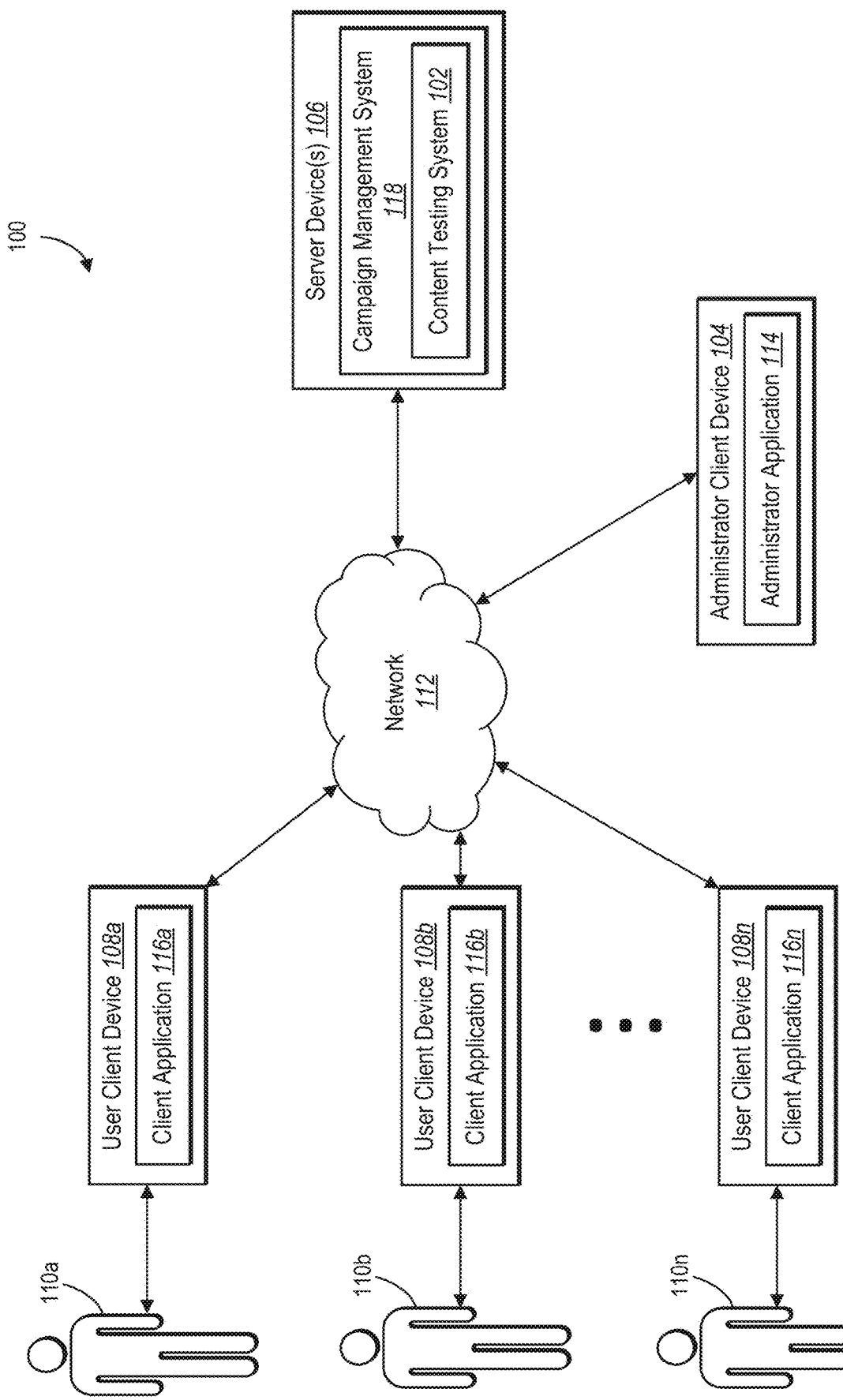
FIG. 1 illustrates an environment in which a campaign content testing system can operate in accordance with one or more embodiments.

One or more embodiments of the present disclosure include a campaign content testing system (or simply "content testing system") that performs multivariate testing of campaign content by employing alternating best-arm identification in a plurality of dimensions using assumptions about a structure of a matrix of parameters. Specifically, the content testing system can alternate sampling combinations of parameters in different parameter sets corresponding to the different dimensions. For example, the content testing system uses best-arm identification within each separate dimension to estimate the highest arms (e.g., parameters with the highest sampling values) within the dimensions. Additionally, the content testing system uses the best arms (i.e., the combinations with the estimated highest sampling values) from each dimension to predict response data and select a combination with the highest predicted value for executing a digital campaign. By assuming that the parameter sets correspond to dimensions in a rank-one matrix and alternating testing in the separate dimensions, the content testing system can quickly and efficiently find a combination that has a highest predicted engagement that meets risk and/or budget requirements.

In one or more embodiments, the content testing system identifies a plurality of parameter sets for a digital campaign. In particular, the parameter sets each correspond to a specific type of parameter that dictate one or more characteristics of the digital campaign. For instance, one or more parameter sets can include parameters that dictate the digital content for providing to recipients in connection with the digital campaign, including text, images, media, or other content. Additionally, a parameter set can include parameters that determine how to send digital content and/or to which recipients to send digital content, such as audience segments, locations, media distribution channels, etc. Accordingly, the content testing system can identify a plurality of parameter sets that can result in a plurality of different combinations for the digital campaign.

Based on the parameter sets, the content testing system can identify a plurality of dimensions of a matrix representing each of the possible combinations of the parameters from the parameter sets. To illustrate, a column dimension of the matrix can correspond to a first parameter set (e.g., the digital content sent as part of the campaign), and a row dimension of the matrix can correspond to a second parameter set (e.g., an audience segment to which the content testing system sends the digital content). Thus, each entry in the matrix corresponds to a separate combination of one parameter of the first parameter set and one parameter of the second parameter set. The content testing system operates under an assumption that response data from recipients for all possible combinations of parameters of the first and second parameter sets result in a rank-one matrix in which all of the columns are linearly dependent, and all of the rows are linearly dependent. This assumption allows the content testing system to select a combination for executing the digital campaign by testing only a subset of the possible combinations and without testing every possible combination.

More specifically, the content testing system leverages the assumption of a rank-one matrix to alternately explore the dimensions of the matrix. In particular, the content testing system utilizes best-arm identification algorithms to analyze individual rows and columns of the matrix, and then uses the results of the best-arm identification algorithms and the rank-one assumption to inform analysis of subsequent rows/columns. More specifically, the content testing system analyzes randomly selected rows or columns (according to the presently analyzed dimension) and estimates a highest sampling value for use in subsequent analysis steps (e.g., the algorithms can utilize sequential elimination or adaptive sampling). Additionally, the content testing system alternates analyzing the rows and columns of the matrix and updates the information for exploration in a given dimension independently of the other dimension. Accordingly, the content testing system effectively executes parallel one-dimensional best-arm identification algorithms at the same time on both dimensions of the matrix.

Once the content testing system has sufficiently analyzed the dimensions of the matrix (e.g., the content testing system has reached a stopping point for analyzing the dimensions based on a stopping rule while meeting risk/budget requirements), the content testing system can then determine a combination with a highest predicted value (which combination will produce the most clicks, conversions, etc.). Specifically, the content testing system can use the highest estimated sampling values from each of the row/column dimensions to select a corresponding combination of parameters from the first parameter set and the second parameter set. The content testing system can then determine that the corresponding combination has a highest predicted value based on the rank-one matrix assumption and use the determined combination for executing the campaign. The content testing system can thus send digital content to a plurality of recipients in accordance with the identified parameters of the determined combination.

As mentioned, the content testing system provides a number of advantages over conventional systems. For example, the content testing system can improve the speed and efficiency of computing systems implementing digital campaign testing. In particular, the content testing system can more quickly analyze many possible combinations of multidimensional parameters for a digital campaign without testing each and every possible combination. For example, for a K by L matrix (i.e., K rows and L columns), conventional systems would need to perform K×L tests (one for each possible combination). The content testing system described herein can instead perform K+L tests (multiplied by some constant), reducing the sampling complexity, and thus the time, for determining a combination for use in executing the digital campaign.

Moreover, the content testing system also reduces the computing load of computing devices implementing campaign management and execution to find an optimal combination of parameters. For instance, in contrast to conventional systems that would have to perform complete A/B/n testing on all possible combinations to find an optimal combination, the content testing system can generate, send, and collect data for a small subset of all possible combinations of digital content in a digital campaign and still determine an optimal combination of parameters with a given tolerance. Indeed, by reducing the number of samples need to be taken to analyze a given number of combinations of parameters, the content testing system can reduce the processing power, storage requirements, and network load of computing devices that test and execute digital campaigns. In cases of large numbers of multivariate combinations, the content testing system can reduce the sample complexity (and therefore, the required resources) by an order of magnitude, or more, over conventional systems. Accordingly, while conventional systems would be unable to realistically test and analyze certain campaigns with large numbers of parameters and combinations given a specific time/sampling budget and/or risk level, the content testing system can accurately determine a best (or approximately best) combination within the required budget and/or risk level.

The content testing system can also reduce expense while improving efficiency and flexibility. Indeed, in one or more embodiments, the content testing system can analyze larger number of combinations of parameters while using the same or less computing power and other resources. Thus, given a budge or time requirement, the content testing system can analyze larger numbers of combinations, and thus, provide increased flexibility in campaign design and execution over conventional systems.

As illustrated by the foregoing discussion, the present disclosure utilizes a variety of terms to describe features and advantages of the content testing system. Additional detail is now provided regarding the meaning of the terms. For example, as used herein, the terms "digital campaign" and "campaign" refer to a series of activities, parameters, and/or rules used in connection with providing digital content corresponding to a product, service, group, individual, entity, or other category. For instance, a digital campaign can include digital content comprising details about a product, service, group, individual, entity, or other category.

As used herein, a "digital content" refers to an electronic item. In particular, a digital content item includes an electronic item provided for display in accordance with a digital campaign. A digital content item can include an electronic message, a digital image, a digital video, digital text, an electronic document, a digital link, a preview of a webpage, a digital illustration, digital artwork, a digital design, etc.

Moreover, as used herein, the term "parameter" refers to characteristics of a digital campaign that determine the digital content, how to deliver the digital content, and/or to where to deliver the digital content. To illustrate, a parameter can determine whether electronic messages include text, images, video, audio, etc., as well as what type of text, images, video, audio, etc., to include in the electronic messages. The content testing system can also use parameters that define the communication medium, including the electronic messages themselves (e.g., delivery by email, advertisement in a webpage, streaming media, television broadcast). Parameters can also determine the recipients of the digital content (e.g., one or more target audience segments). Executing a digital campaign, therefore, can include sending digital content that includes characteristics determined by a first parameter to a target audience determined by a second parameter.

Additionally, as used herein, the term "parameter set" refers to a plurality of parameters of a specific type. Thus, a parameter set can include a plurality of different versions of a given parameter type. For example, a parameter set can comprise different versions of text or images to include in digital content. In another example, a parameter set can include a plurality of different audience segments (e.g., users with specific characteristics, users in a specific location). Additionally, as used herein, the term "combination" refers to a version of digital content that includes at least a parameter of a first parameter set and a parameter of a second parameter set.

As used herein, the term "dimension" refers to one or more row or columns, within a matrix, associated with a single parameter set. In particular, in a two-dimensional matrix, a dimension can refer to a row dimension corresponding to each of the row vectors in the matrix or a column dimension corresponding to each of the column vectors in the matrix. While the examples herein describe matrices with two dimensions, the content testing system can use tensors with more than two dimensions (i.e., for combinations of parameters from more than two parameter sets).

Furthermore, as used herein, the term "rank-one matrix" refers to a matrix that can be written as the outer product of two vectors (e.g., a column vector and a row vector). A "rank-one assumption" is an assumption that a parameter matrix (e.g., a matrix with rows of a first parameter set and columns of a second parameter set) has a rank-one structure. In other words, a rank-one assumption assumes that the parameter in a first parameter set that produces the highest sampling value is independent of the parameters of the second parameter set. Similarly, a rank-one assumption assumes that the parameter in a second parameter set that produces the highest sampling value is independent of the parameters of the first parameter set.

As used herein, a "digital user interaction" (or "interaction") refer to data associated with one or more actions taken by a user via a client device. In particular, digital interaction includes an indication of one or more actions with respect to a digital content item presented to the user via a client device. For example, a digital interaction can refer to an identification of a click, download, save, purchase, or other observable action taken by a user with respect to a digital content item via a client device. In addition, a digital interaction can include data associated with the digital content item with which the user interacts.

As used herein, the term "response data" refers to data received based on recipient interactions with digital content. For example, response data can include whether recipients view digital content, interact with digital content, and how the recipients interact with digital content. To illustrate, response data can include number of clicks, click through rate, number of conversions resulting from clicks, etc.

Additionally, as used herein, the term "sampling value" refers to a value of sampled combination of parameters. For instance, the content testing system samples parameters for a particular combination by selecting a first parameter and a second parameter and sending digital content to a target audience based on the first and second parameters. The content testing system then collects or tracks interactions with the digital content to determine a sampling value for the combination of parameters. The sampling value can be expressed in terms of response data (number of clicks, click through rate, number of conversions, etc.).

As used herein, the term "best-arm identification algorithm" refers to an algorithm that analyzes a row or column to estimate a highest value in the row/column in a multi-armed bandit problem. Specifically, as described herein, a best-arm identification (or "BAI") algorithm attempts to identify, for a fixed confidence $\delta$, the best "arm" (e.g., combination analyzed) with confidence of at least $1-\delta$ from as few observations as possible. For example, a BAI algorithm can use confidence intervals of reward values to estimate a highest reward value with a given confidence level based on risk and/or budget. Example BAI algorithms include adaptive sampling, successive elimination or racing, tracking of optimal allocation weights, and Thompson sampling. In one or more embodiments, the content testing system utilizes KL-LUCB ("lower upper confidence bound") or KL-Racing. The KL-LUCB is described by Emilie Kaufmann, Olivier Cappé, and Aurelien Garivier in *On the complexity of best arm identification in multi-armed bandit models*, The Journal of Machine Learning Research, 2016, 17, pp. 1-42, the entire contents of which are hereby incorporated by reference. In additional embodiments, the content testing system 102 utilizes the Track-And-Stop algorithm as described by Aurelien Garivier and Emilie Kaufmann in *Optimal Best Arm Identification with Fixed Confidence*, JMLR: Workshop and Conference Proceedings vol. 49:1-30, 2016, the entire contents of which are hereby incorporated by reference. In still further embodiments, the content testing system 102 utilizes the Top-two Thompson sampling described by Daniel Russo in Simple Bayesian Algorithms for Best Arm Identification, JMLR: Workshop and Conference Proceedings vol. 49:1-2, 2016, the entire contents of which are hereby incorporated by reference.

Additional detail will now be provided regarding the content testing system in relation to illustrative figures portraying exemplary embodiments. For example, FIG. 1 illustrates an embodiment of an environment 100 in which a content testing system 102 can operate. In particular, the environment 100 includes an administrator client device 104, server device(s) 106, and user client devices 108a, 108b-108n associated with users 110a, 110b-110n. One or more of the components may be in connection via a network 112. Moreover, as shown, the administrator client device 104 includes an administrator application 114, the user client devices 108a, 108b, 108n include client applications 116a, 116b-116n and the server device(s) 106 include a campaign management system 118, which includes the content testing system 102 to test and execute digital content in a digital campaign.

In one or more embodiments, the administrator client device 104 includes a computing device capable of performing operations associated with managing a digital campaign for providing digital content to the users 110a-n. For example, the administrator client device 104 can include a desktop computer, laptop computer, tablet, smartphone, or other device that is able to access the content testing system 102 via the network 112. As mentioned, the administrator client device 104 can include the administrator application 114, which can include software for communicating with the server device(s) 106 to provide and obtain information related to digital campaign management operations described herein.

Additionally, the user client devices 108a-n include computing devices capable of receiving digital content as part of a digital campaign. For example, each of the user client devices 108a-n can include a computing device that is able to communicate with the campaign management system 118 to receive digital content via the network 112. For example, one or more of the devices may include a mobile device such as a mobile telephone, a smartphone, a PDA, a tablet, or a laptop computer. Additionally, or alternatively, one or more of the devices may include a non-mobile device such as a desktop computer. The user client devices 108a-n also include client applications 116a-n that include software (e.g., a web browser, email client, or other application) that allows the users 110a-n to view advertisements, emails, or other electronic messages that include digital content from a digital campaign. The user client devices 108a-n can also communicate with the campaign management system 118 via the network 112 to provide user interaction data, which the campaign management system 118 can transform into response data.

According to one or more embodiments, the campaign management system 118 allows an entity to manage one or more digital campaigns. For example, an administrator associated with the entity can access the campaign management system 118 via the network 112 to manage a plurality of campaigns for sending digital content to recipients in one or more target audiences. In particular, the administrator can use the administrator application 114 of the administrator client device 104 to provide digital content to the campaign management system 118, which can then provide the digital content to the users 110a-n via the user client devices 108a-n. In one or more embodiments, the administrator obtains the digital content from content creators (e.g., via a content database on which the content creators store the digital content). Alternatively, the administrator can create the digital content or allow a computing device (e.g., the administrator client device 104) to dynamically, and automatically, generate the digital content based on input from the administrator.

Furthermore, in one or more embodiments, the campaign management system 118 can allow an administrator to provide a plurality of versions of digital content in connection with executing a digital campaign. As described in more detail below, when the administrator provides more than one version of digital content to the campaign management system 118, the campaign management system 118 can utilize the content testing system 102 to determine which version of digital content to deliver during wide scale execution of the campaign. For instance, the content testing system 102 can test at least some of the versions of the digital content by providing the tested versions to a subset of recipients. Additionally, the content testing system 102 can obtain response data for the tested versions and then use the response data to determine a best version for use in the final campaign.

Specifically, as described in more detail below, the content testing system 102 uses an assumption that the response data for the different versions of the digital content results in a rank-one matrix. Under such an assumption, the content testing system 102 can then alternately explore the dimensions of the matrix to determine which versions of the digital content to test and/or which to which audience segment to provide a selected version of the digital content. The content testing system 102 can use each series of tests to learn which combinations to perform next, and so on, until the content testing system 102 can determine an optimal combination of parameters to use for the campaign. In particular, the content testing system 102 can alternately explore dimensions of the matrix to determine that a combination of parameters has a highest estimated sampling value and then uses that combination of parameters to execute the campaign.

More particularly, the content testing system 102 samples combinations of parameters by selecting combinations of parameters and testing the combinations by sending digital content based on the selected combinations of parameters to user devices. The content testing system 102 then collects response data for the tested combinations of parameters. The content testing system 102 uses the results (e.g., response data) for the tested combinations of parameters and a rank-one assumption to select the next combinations of parameters to sample. For example, if a tested combination produces a lower sampling values than other combinations, the content testing system 102 can avoid sampling the parameters in the combination based on the rank-one assumption. Thus, the content testing system 102 can use the rank-one assumption to identify parameters to sample. In other words, the content testing system 102 can use the rank-one assumption to learn optimal parameters in a statistically efficient manner.

As mentioned, the campaign management system 118 also collects response data from the user client devices 108a-n in connection with digital content provided to the user client devices 108a-n. For instance, the campaign management system 118 can provide the digital content to user client devices 108a-n. The campaign management system 118 can then monitor interactions by the users 110a-n with the digital content (e.g., via the client applications 116a-n). The campaign management system 118 can store the response data, provide the response data to the content testing system 102 to select a combination for use in executing the campaign, and report the response data to the administrator client device 104 (e.g., within the administrator application 114).

In one or more embodiments, the campaign management system 118 manages campaigns for a plurality of entities. For example, the campaign management system 118 can communicate with a number of different entities (e.g., administrator client devices) via the network 112 to manage one or more campaigns for each of the entities. To illustrate, the campaign management system 118 can store digital content and/or response data for each entity separately from other entities to provide campaign management for each entity individually. Furthermore, the campaign management system 118 can collect response data from recipients of digital content in connection with the campaigns and report the response data to the entities in accordance with the campaigns associated with the entities.

Although the environment 100 of FIG. 1 is depicted as having various components, the environment may have any number of additional or alternative components (e.g., any number of server devices, administrator client devices, user client devices, or other components in communication with the campaign management system 118). In particular, FIG. 1 illustrates a particular number and arrangement of client devices 108a-n corresponding to respective users 110a-n, it will be understood that the environment 100 can include any number of devices, including any number of server devices or client devices. Accordingly, the content testing system 102 can utilize information for any number of administrators to manage campaigns and provide digital content to any number of customer client devices. Furthermore, while one or more embodiments of the campaign management system 118 provide digital content to user client devices, entities can utilize the campaign management system 118 (i.e., the content testing system 102) to determine parameters for a campaign and then provide the digital content directly to the user client devices, rather than via the server device(s) 106.

Figures 2A, 2B:
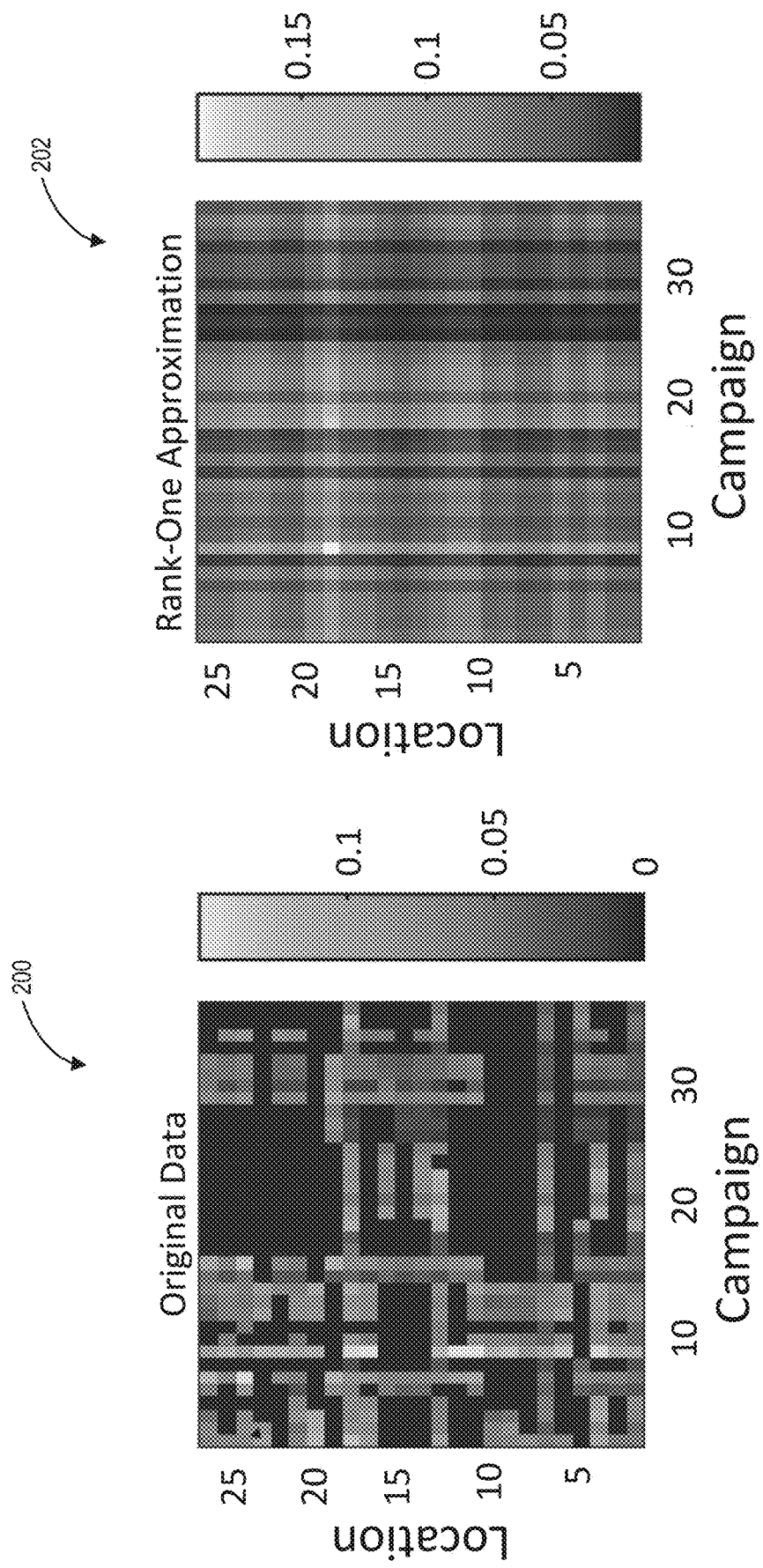
FIGS. 2A-2B illustrate diagrams of embodiments of matrices representing response data for a plurality of versions of digital content in a digital campaign in accordance with one or more embodiments.

As briefly mentioned previously, the content testing system 102 performs the operations described herein under an assumption that response data for multivariate tests of digital content in a digital campaign can be approximated using a rank-one matrix. FIGS. 2A-2B illustrate an example of real world response data that the content testing system 102 approximates and reconstructs with a rank-one matrix. Specifically, FIG. 2A illustrates a matrix 200 including actual response data collected for a campaign. FIG. 2B illustrates a rank-one matrix 202 that approximates/reconstructs the actual response data into a completed matrix.

As illustrated, the matrix 200 of actual response data corresponds to a plurality of emails sent to a plurality of recipients. In particular, the response data corresponds to emails for different campaigns (36 products) sent to recipients in different locations (28 countries). For example, each of the different campaigns include different content (text, images, etc.) corresponding to the different products. The response data for the emails sent indicated that, of the 71.5 million emails sent, approximately 16 million emails were opened, and approximately 760,000 clicked on links within the emails. Additionally, as illustrated, the response data indicates different click-to-open rates for each of the versions of the email and each location recorded (brighter cells indicating higher click-to-open rates and darker cells corresponding to lower click-to-open rates)

Also, because of the many different possible combinations of content versions and locations for the email campaign, the actual response data does not include response data for every possible combination, resulting in empty values within the matrix 200. The content testing system 102 can reconstruct the response data to fill in the empty values by approximating the response data as a rank-one matrix 202. While the values of the rank-one matrix 202 are not exactly equal to the actual response data in matrix 200, the approximation provides values that are sufficiently similar to the actual response data to allow the content testing system 102 to reconstruct the response data for all possible combinations. Additional details of analysis and proofs of the processes herein are described in more detail later in the present disclosure.

As described in more detail below, the rank-one assumption of response data allows the content testing system 102 to decrease the sample complexity for testing combinations of parameters for one or more digital campaigns. In particular, the rank-one assumption allows the content testing system 102 to test a subset of possible combinations, rather than every combination, and still meet a confidence threshold for selecting the best combination. To illustrate, the rank-one assumption allows the content testing system 102 to sequentially test and evaluate combinations of parameters using an analysis that alternately and intelligently explores and evaluates dimensions of a corresponding matrix.

Figure 3A:
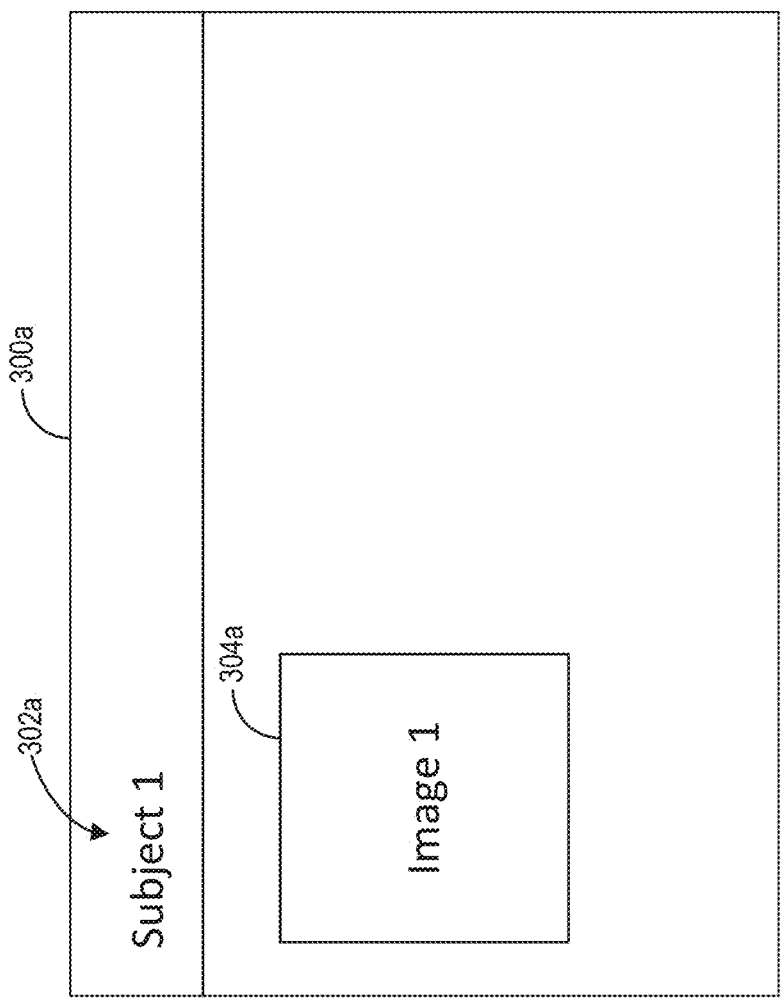
FIGS. 3A-3B illustrate a plurality of different versions of digital content in a digital campaign in accordance with one or more embodiments.
Figure 3B:
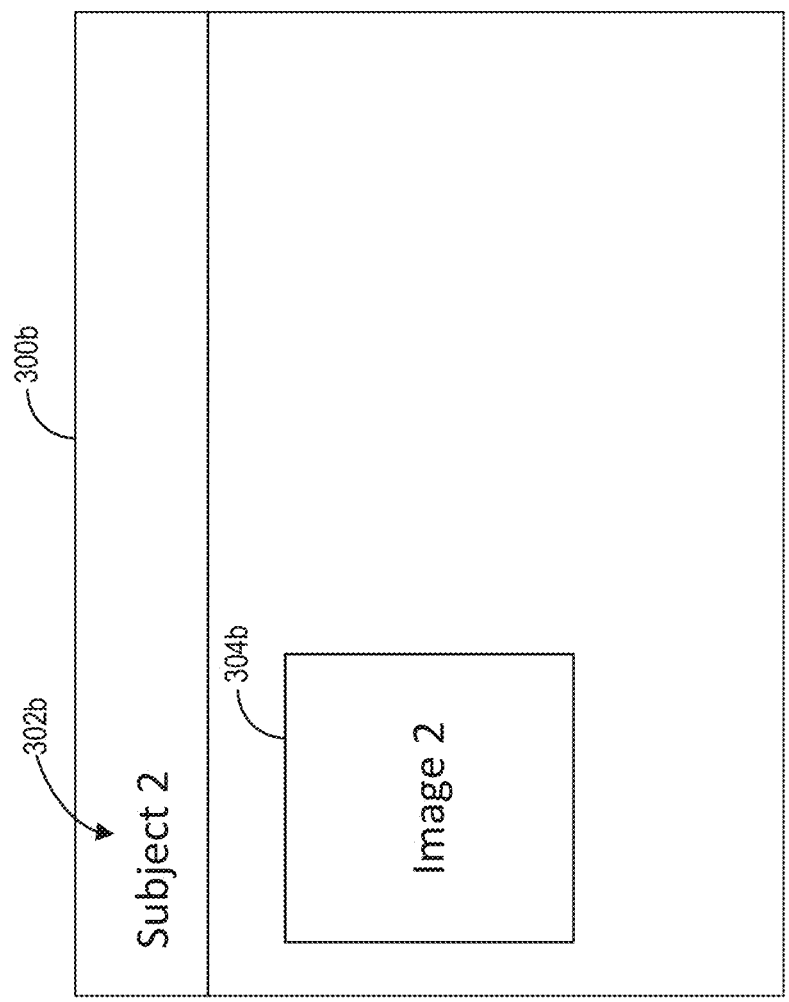

Furthermore, while the above example of rank-one assumption of real-world data is described in terms of a plurality of campaigns for different products in which the analyzed parameters include different campaigns in combination with different locations, the content testing system 102 can test and evaluate other types of parameters, including different combinations of content of the digital content itself. For example, FIGS. 3A-3B illustrate different versions of digital content that the content testing system 102 can test and evaluate for a given campaign. Specifically, FIG. 3A illustrates a first embodiment of digital content that the content testing system 102 can test for a digital campaign. FIG. 3B illustrates a second embodiment of digital content that the content testing system 102 can test for the digital campaign.

As illustrated in the embodiments of FIGS. 3A-3B, the content testing system 102 tests a plurality of different versions of an email. For example, in the embodiment of FIG. 3A, a first version 300a of an email includes a first subject 302a and a first image 304a. In the embodiment of FIG. 3B, a second version 300b of the email includes a second subject 302a and a second image 304b. Accordingly, the first version 300a and second version 300b represent different combinations of possible parameters for parameters types that include the subject and the image of the email. As one can appreciate, other versions of the email can include a combination of the first subject 302a and the second image 304b or the second subject 302b and the first image 304a. Additionally, each parameter may include a number of other possible values (e.g., a third subject, a third image, and so on), resulting in any number of possible combinations of the two parameters.

Additionally, although the examples described relate to two-dimensional matrices including combinations of parameters from two parameter sets, the content testing system 102 can test and evaluate combinations of parameters from more than two parameter sets. In particular, the content testing system 102 can perform the testing operations described herein on n-dimensional matrices. For instance, in the context of the embodiments of FIGS. 3A-3B, the different versions of the email may also include different body content in addition to the different subjects and images. Thus, the content testing system 102 can test and evaluate combinations in the resulting 3-dimensional matrix. Additionally, the content testing system 102 can test and evaluate combinations for combinations of multiple parameters defining the digital content and an additional parameter defining a target audience of the digital campaign.

In accordance with the rank-one assumption described previously, the content testing system 102 tests and evaluates the different combinations of parameters in a campaign by alternately exploring and evaluating the individual dimensions of a corresponding parameter matrix, as described previously. Specifically, the content testing system 102 determines a vector for each dimension including the possible parameters of a parameter set. For instance, in the context of the embodiments of FIGS. 3A-3B, the content testing system 102 determines a first vector for a first parameter set corresponding to the subject of the email and a second vector for a second parameter set corresponding to the image of the email. Accordingly, the first parameter set includes a plurality of different subjects that may be included in the email and the second parameter set includes a plurality of different images that may be included in the email. A resulting matrix would thus include a first dimension (e.g., rows) corresponding to the first parameter set and a second dimension (e.g., columns) corresponding to the second parameter set, with each value in the matrix corresponding to a combination of one parameter from each of the parameter sets.

Figure 4A:
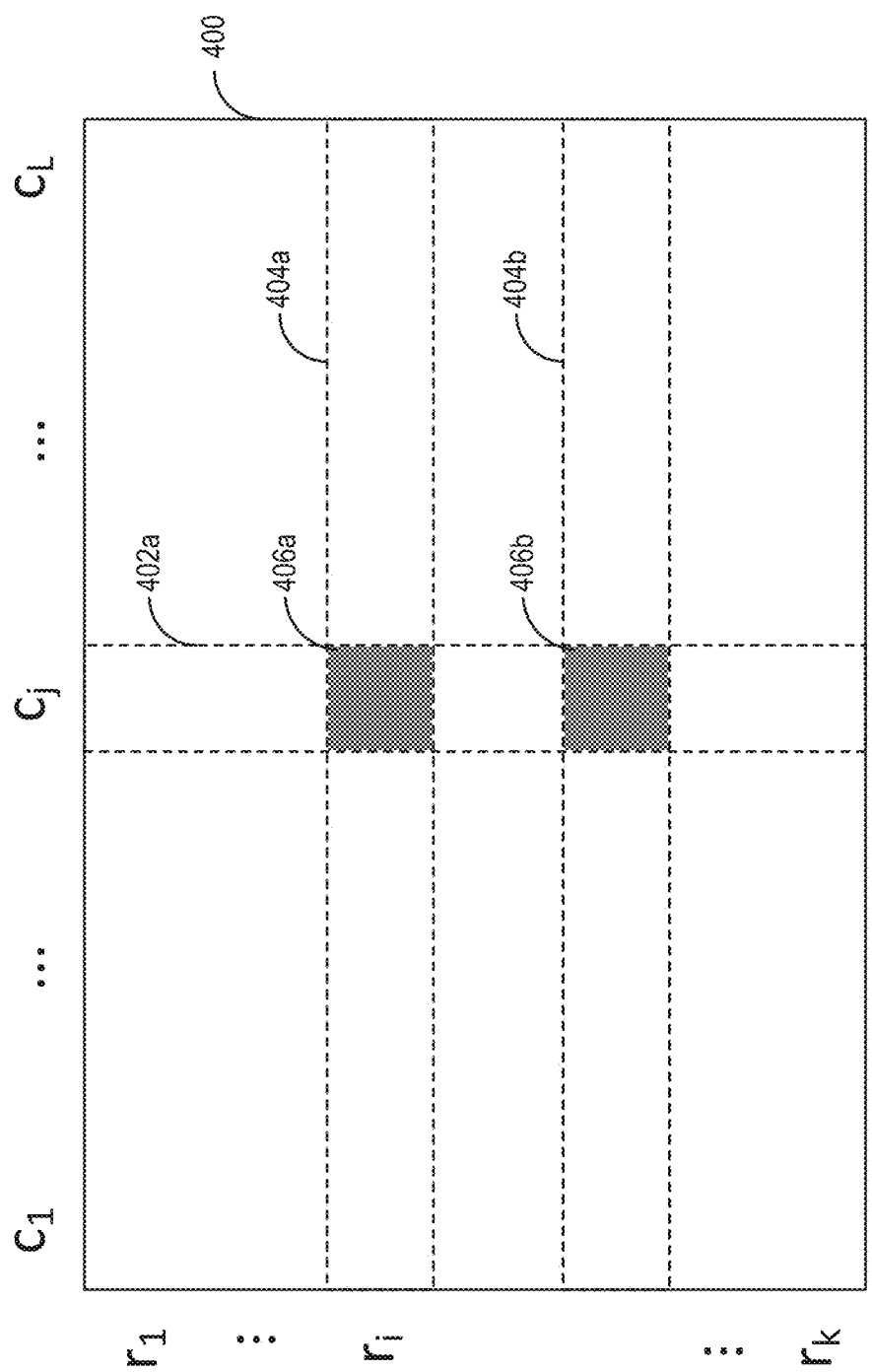
FIGS. 4A-4D illustrate diagrams of a process of alternately sampling response data within a first dimension and a second dimension of a matrix in accordance with one or more embodiments.
Figure 4B:
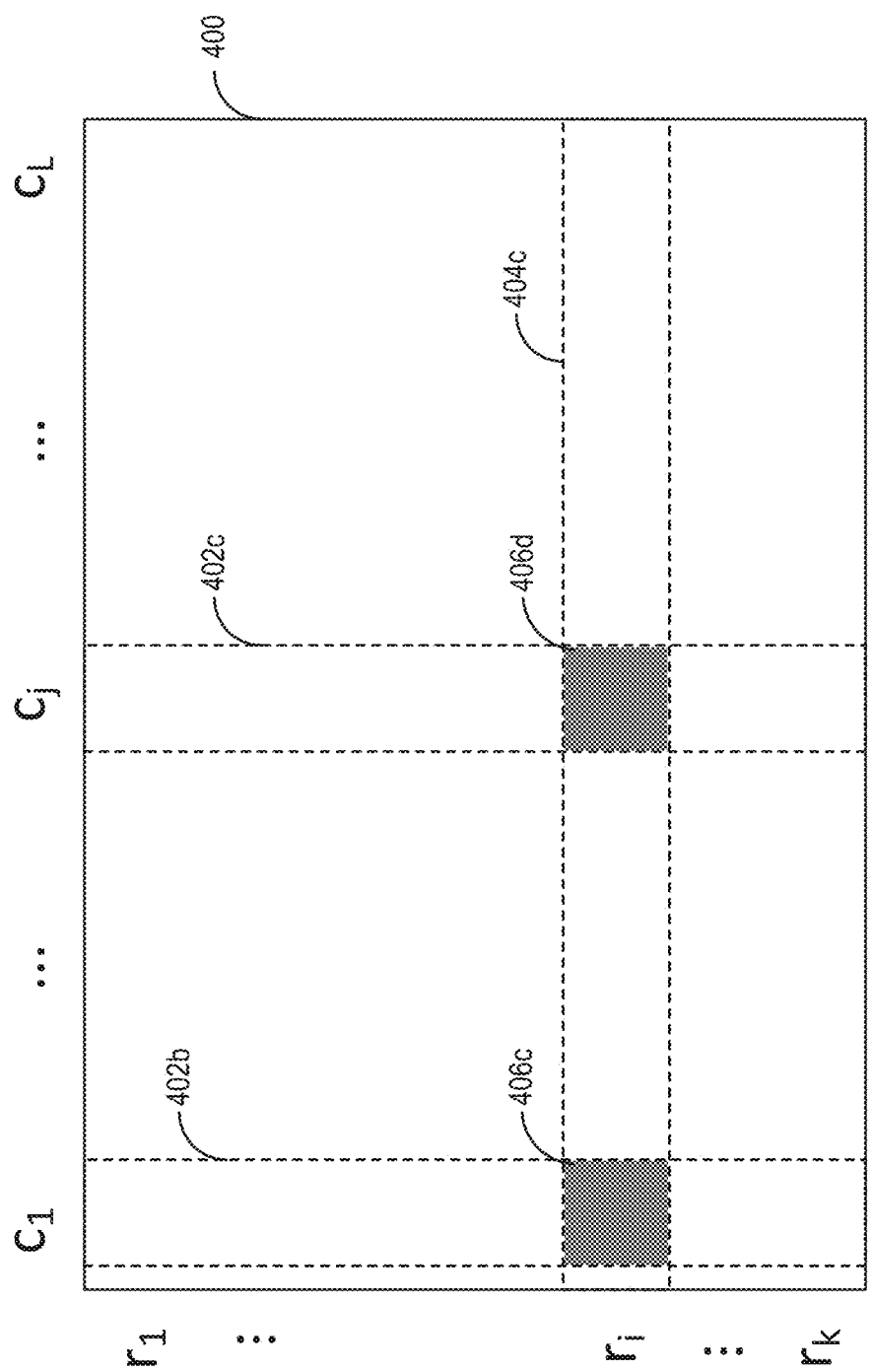
Figure 4C:
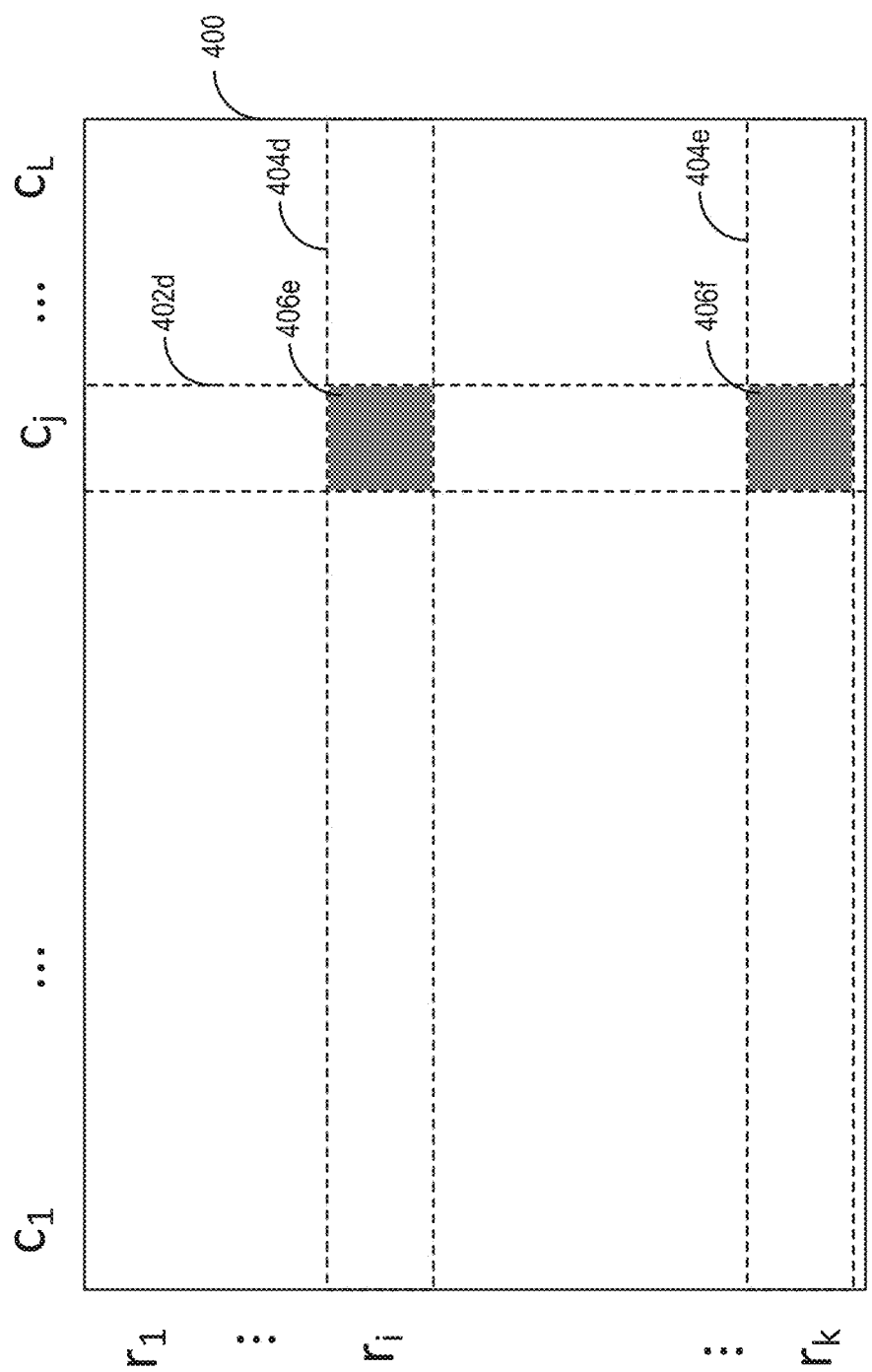
Figure 4D:
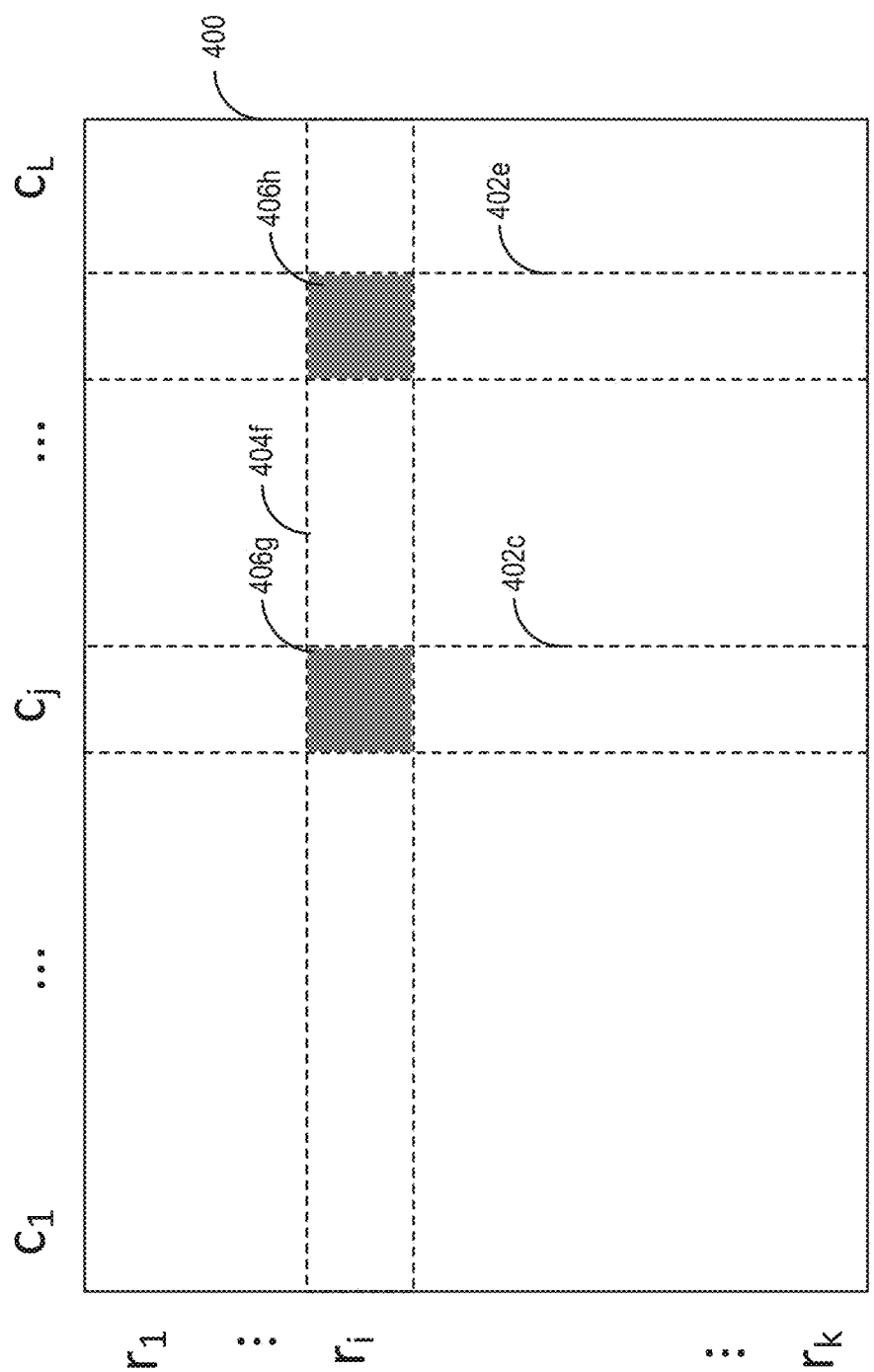

FIGS. 4A-4D illustrate a process for alternately exploring the dimensions of a matrix that includes combinations of parameters from two parameter sets. For instance, as described above, the parameter sets may include parameters that define the digital content (e.g., email subject, email content) and/or audience segments. FIGS. 4A and 4C illustrate exploration phases for exploring a first dimension corresponding to rows of a matrix 400. FIGS. 4B and 4D illustrate exploration phases for exploring a second dimension corresponding to columns of the matrix 400. While FIGS. 4A-4D illustrate embodiments of alternating exploration of a plurality of rows and a plurality of columns (i.e., exploring a row dimension, then a column dimension, then the row dimension, and so on), the content testing system 102 can alternately explore the rows and columns in any order (e.g., a plurality of rows, then a plurality of columns, then a plurality of rows, and so on).

In one or more embodiments, to explore the first dimension corresponding to K number of rows, the content testing system 102 utilizes a BAI algorithm that analyzes the dimension as a multi-armed bandit problem in which the combinations of parameters from the first parameter set and the second parameter set represent the "arms" of the problem.

The content testing system 102 can determine the BAI algorithm to use based on a previously determined performance of the BAI algorithm with the content testing processes described herein. Additionally, the content testing system 102 can determine the BAI algorithm to use based on the type of data that the content testing system 102 is evaluating, as certain BAI algorithms may perform better for certain data types than other BAI algorithms.

After the content testing system 102 has determined a BAI algorithm to use, the content testing system 102 utilizes the BAI algorithm and a rank-one assumption to alternately explore each dimension in the matrix 400. As illustrated in FIG. 4A, the content testing system 104a performs a process of exploring a first dimension (e.g., a row dimension) of a matrix 400 by evaluating a plurality of combinations in a plurality of rows (i.e., K number of rows, or "$r_1$"-"$r_k$") of the matrix 400. In particular, the content testing system 102 begins by selecting a column 402a of a plurality of columns (i.e., L number of columns "$c_1$"-"$c_L$") in the matrix 400. In one or more embodiments, the content testing system 102 initially selects the column 402a randomly (e.g., uniformly at random from the L number of columns). The content testing system 102 then uses the selected BAI algorithm to analyze a plurality of rows (e.g., rows 404a, 404b) and pulls the arms (i.e., combinations 406a, 406b) corresponding to the intersections of the rows 404a, 404b with the column 402a.

The content testing system 102 then tests the corresponding combinations (e.g., combinations 406a, 406b), for example, by sending digital content in accordance with the parameters of the combinations to a plurality of recipients. For example, in the context of FIG. 3A-3B, if the versions 300a, 300b are selected by the BAI algorithm, the content testing system 102 can send the versions 300a, 300b to a number of recipients for testing the versions 300a, 300b. The content testing system 102 can then obtain response data for the versions 300a, 300b from the recipients and record the response data for the corresponding cells of the matrix 400.

In one or more embodiments, the content testing system 102 uses the BAI algorithm and a rank-one assumption to test a plurality of rows until the content testing system 102 can identify a winner for the first dimension. For example, the content testing system 102 can analyze as many rows for the selected column 402a as the content testing system 102 determines are necessary for determining a winner. To illustrate, the content testing system 102 can run on rows in column 402a until the content testing system 102 determines that the combination 406a is the best combination in the column 402a (or the best combination from the tested combinations), which may result in the content testing system 102 running on all the rows or on a subset of rows. In particular, the content testing system 102 may analyze all of the rows during a first (or initialization) phase of exploration in the first dimension, and then analyze a subset of rows in subsequent phases. Alternatively, the content testing system 102 may analyze only a subset of rows during the initialization phase and different subsets of rows in subsequent phases.

The content testing system 102 can then determine that the row 404a has the highest sampling value for the present exploration of the dimension. Specifically, for each of the tested rows (i.e., tested combinations corresponding to the rows), the content testing system 102 can generate cumulative reward data (e.g., cumulative response data). For instance, the content testing system 102 can generate cumulative reward data that is the sum of values (e.g., response data) for current and previously tested combinations within a row. The content testing system 102 then averages the cumulative reward data for a row by dividing the cumulative reward data by the number of times the row has been pulled (i.e., the number of combinations tested). The highest sampling value for each exploration phase is based on the averaged reward value for a row, which in the first phase is the single highest reward value of the rows.

In one or more embodiments, after exploring the first dimension corresponding to the rows of the matrix 400 in connection with column 402a, the content testing system 102 utilizes the BAI algorithm and a rank-one assumption to explore the second dimension corresponding to the columns of the matrix 400. In particular, as illustrated in FIG. 4B, the content testing system 102 selects a row (e.g., row 404c) of the plurality of rows in the matrix 400. As described above with the column 402a, the content testing system 102 can initially select the row 404c randomly (e.g., uniformly at random). The content testing system 102 uses the BAI algorithm to analyze a plurality of columns (e.g., columns 402b, 402c) and pulls the arms (i.e., combinations 406c, 406d) corresponding to the intersections of the columns 402b, 402c with the row 404c.

The content testing system 102 then tests the corresponding combinations (e.g., combinations 406c, 406d) by sending digital content in accordance with the parameters of the combinations to a plurality of recipients. For instance, in the context of FIGS. 3A-3B, the content testing system 102 can send other versions of the email, each with a specific subject/image combination of the possible subject/image combinations. The content testing system 102 receives response data for the tested versions corresponding to the combinations and records the response data for the corresponding cells of the matrix 400.

Similar to the description above with respect to testing in the first dimension, the content testing system 102 tests the plurality of columns until the content testing system 102 can identify a winner for the second dimension. Specifically, the content testing system 102 can analyze a plurality of columns for the selected row 404c until the content testing system 102 can identify a best combination in the row 404c (or best combination from the tested combinations). The content testing system 102 can use the BAI algorithm to test all of the columns in the row 404c or a subset of rows. During the first iteration (e.g., initialization) of exploration in the second dimension, the content testing system 102 can analyze all of the columns. During subsequent iterations, the content testing system 102 may analyze only a subset of the columns.

In one or more embodiments, the content testing system 102 may determine after an exploration phase of each dimension that the row with the highest sampling value and the column with the highest sampling value correspond to the combination with the highest sampling value of the matrix 400. In particular, under the rank-one matrix assumption, because each row is a multiplication of an initial row (based on the linearly dependence of the rows), the highest sampling value would hold true for every combination in the same row in the absence of noise (i.e., in an ideal scenario with each exploration step producing no noisy observations). The same is true for the highest sampling value in the columns.

In the presence of noise (i.e., when exploration steps produce noisy observations), however, the content testing system 102 may use additional exploration phases for each dimension to verify the results of the first phases. Indeed, the content testing system 102 can use any number of exploration phases in each dimension to determine the combination with the highest sampling value in the matrix 400 while meeting a specific risk level, budget, confidence threshold, etc. In at least some implementations, noise can be representative of different variables that an entity may use to determine whether a campaign is successful. For instance, the noise can be variables or metrics that the content testing system 102 does not directly observe, but rather derives from tracked response data (e.g., click-to-open rates are derived from the number of messages opened and the number of links clicked in opened messages).

FIGS. 4C and 4D illustrate additional exploration phases of the first dimension and the second dimension. Specifically, FIG. 4C illustrates exploration of the first dimension corresponding to the testing and evaluation of rows in the matrix 400. As mentioned, the exploration of the first dimension illustrated in FIG. 4C (i.e., exploration in each subsequent exploration phase) occurs after a first phase of the first dimension. Thus, the content testing system 102 can use information from the first phase of the first dimension including the cumulative reward data for each row and the number of times the content testing system 102 has tested combinations in each row.

As above, the content testing system 102 performs exploration in the first dimension by selecting a column (e.g., column 402d) from the columns in the matrix 400 based on the past testing results and the rank-one assumption. Thus, the content testing system 102 may not select columns that tested poorly in a previous iteration or the content testing system 102 may select columns that tested poorly in a previous iteration at a lower selection probability. The content testing system 102 then uses the BAI algorithm to analyze rows in combination with the selected column 402d until the content testing system 102 determines a winning row.

The content testing system 102 may determine a plurality of rows to test based on previous phases in the dimension, such that the content testing system 102 may not test all of the rows in the matrix 400. To illustrate, the content testing system 102 may determine that at least some of the rows are not likely to be winners and may exclude them from further testing. Alternatively, the content testing system 102 may determine a sequence of testing rows based on some other method, randomly, or by some other method that selects a subset of all rows for testing in any given phase (and similarly for columns). For example, the content testing system 102 can use an adaptive choice by maintaining statistics for each cell of the matrix and using the results of the BAI algorithm on the second dimension to inform the selection of rows for testing in the first dimension.

As illustrated in FIG. 4C, the BAI algorithm tests a plurality of combinations 406e, 406f resulting from the intersections of rows 404d, 404e. In one or more embodiments, the rows 404d, 404e tested in additional phases are different than the rows 404a, 404b tested in connection with the description of FIG. 4A. Accordingly, the content testing system 102 updates the cumulative reward data for each of the rows 404d, 404e separately from the previously tested rows. Additionally, the content testing system 102 increments a value indicating the number of times the content testing system 102 has tested combinations in each row.

After exploring the first dimension, the content testing system 102 continues by performing one or more additional exploration phases in the second dimension, as illustrated in FIG. 4D. Specifically, and similar to the additional exploration phases in the first dimension, the content testing system 102 selects a row 404f and then tests a plurality of combinations 406g, 406h at intersections of the row 404f with a plurality of columns 402*c*, 402*e*. As illustrated, the content testing system 102 pulls combinations from column 402*c* in separate exploration phases, as illustrated in FIG. 4B and FIG. 4D. In particular, combination 406*d* and combination 406*g* involve column 402*c* intersecting with two different rows (i.e., row 404*c* and row 404*f*).

Additionally, after testing the combination 406*g* and receiving response data from a plurality of recipients, the content testing system 102 can update the cumulative reward data for column 402*c* to include the reward data resulting from combination 406*d* and combination 406*g*. Accordingly, the cumulative reward data for column 402*c* is a sum of combination 406*d* and combination 406*g*. Furthermore, the averaged reward data for column 402*c* is equal to the cumulative reward data divided by the number of times the content testing system 102 has tested combinations from column 402*c* (in this case, two).

The content testing system 102 continues iterating between the first dimension and the second dimension, updating each cumulative reward data and number of times the content testing system 102 has tested combinations in each arm during each exploration phase within a dimension. Specifically, the content testing system 102 stores the cumulative reward data and number of times pulled in each dimension independently of the other dimension. For a two-dimensional matrix, the content testing system 102 maintains cumulative reward data for each row or column independently within the corresponding dimension. Thus, the content testing system 102 maintains cumulative reward data for each row independently of cumulative reward data for each column based on the tested combinations in the separate dimension exploration phases.

In one or more embodiments, the content testing system 102 includes a stopping rule for determining when to stop exploration within a dimension. For instance, the content testing system 102 can use the stopping rule to determine when to select an arm for the present dimension based on the averaged reward data for the plurality of arms in the present dimension. To illustrate, the stopping rule can be based on a predetermined sample complexity (e.g., number of samples/tests performed for combinations in the matrix 400) budget, such that the content testing system 102 stops iterating between the dimensions in response to meeting the sample complexity. Alternatively, the stopping rule can be based on a risk level or risk parameter in a fixed-confidence setting that requires the content testing system 102 to meet the risk level while maintaining the sample complexity as small as possible.

In response to determining the best arms in each dimension (e.g., the row and column with the highest sampling values), the content testing system 102 then determines the combination with the highest sampling value in the matrix 400. In the context of FIGS. 4A-4D, the content testing system 102 can determine, for example, that row 404*f* has the highest sampling value (i.e., a highest averaged reward value) among the rows, and column 402*c* has the highest sampling value among the columns of the matrix. Because the matrix 400 is assumed to be a rank-one matrix, the content testing system can determine that the combination 406*g* corresponding to the intersection of the row 404*f* and the column 402*c*, illustrated in FIG. 4D, has the highest sampling value in the matrix 400. The content testing system 102 can then execute the digital campaign according to the combination 406*g* (i.e., by using the parameters of the first parameter set and second parameter set associated with the combination).

Figure 5A:
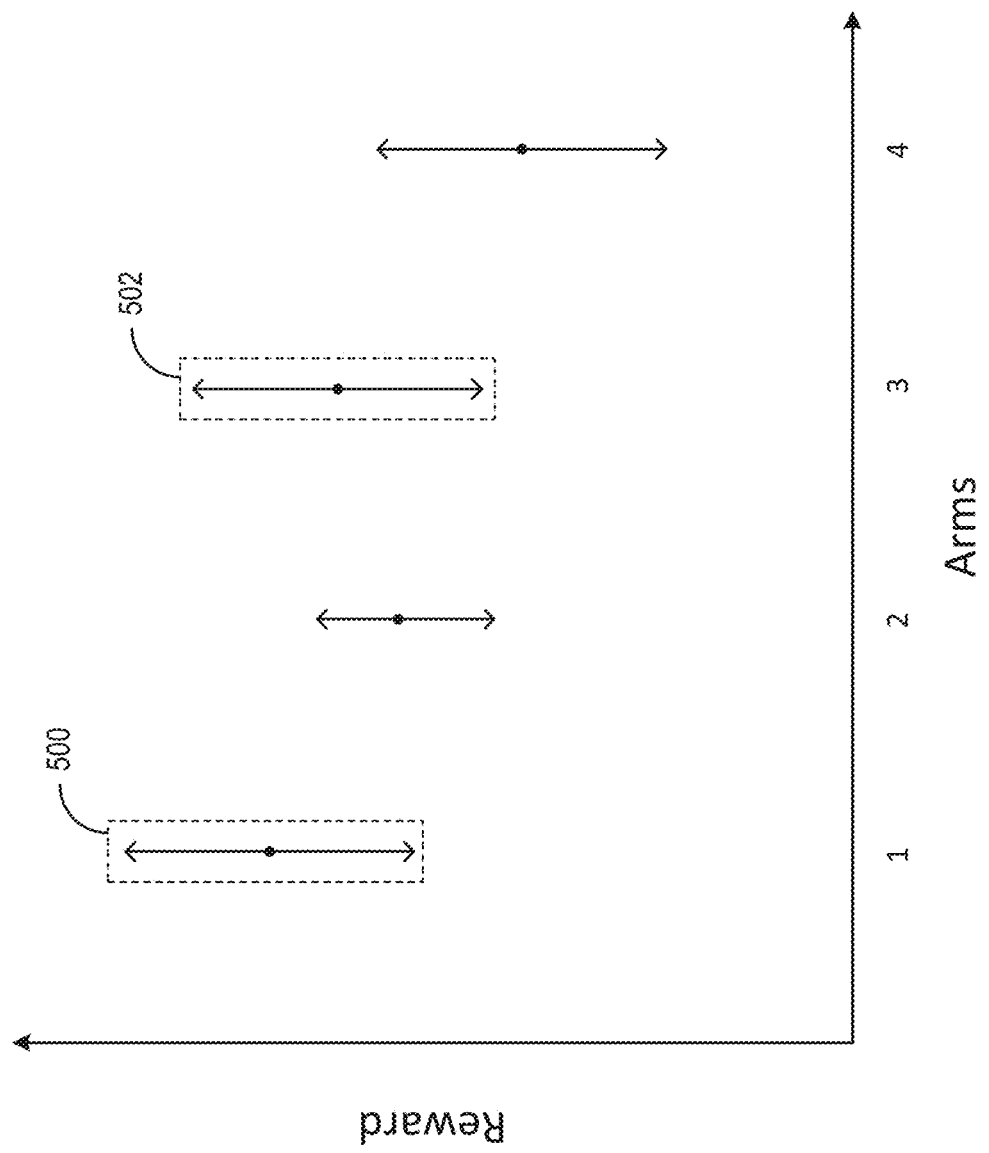
FIGS. 5A-5B illustrate diagrams of various embodiments of a process for determining a highest sampling value in a dimension in accordance with one or more embodiments.
Figure 5B:
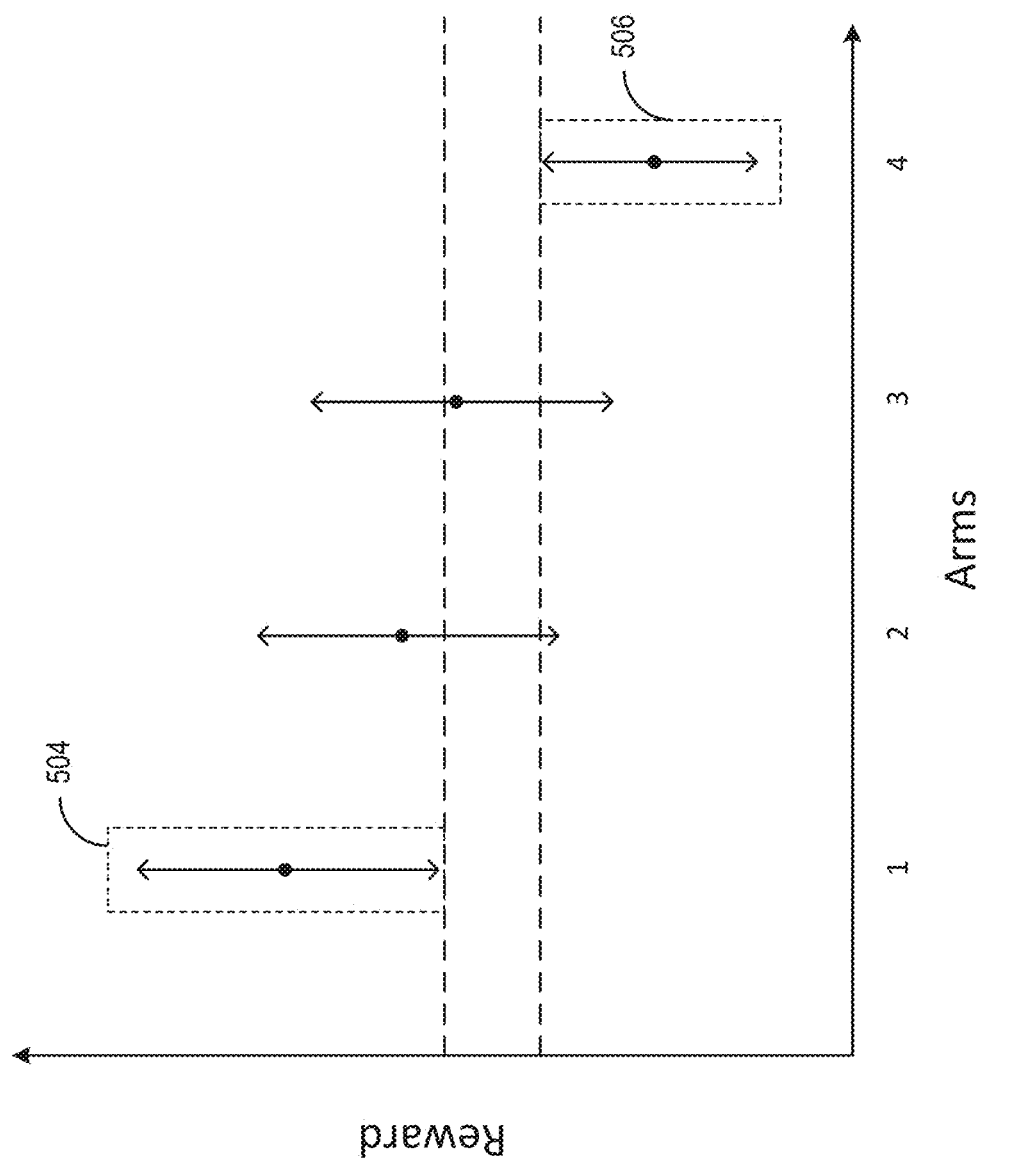

As described previously, the content testing system 102 can utilize a BAI algorithm that select a leader arm for a multi-armed bandit problem within each dimension. FIGS. 5A-5B illustrate a plurality of methods of selecting a leader arm in a multi-armed bandit problem. In one or more embodiments, as briefly mentioned, a BAI algorithm utilizes adaptive sampling to determine the best arm. Specifically, adaptive sampling strategies use finely tuned confidence intervals to determine a current leader arm and a closest challenger arm, and then stop whenever the current leader arm and closest challenger arm are distinguishable with high confidence (i.e., when their confidence intervals no longer overlap).

FIG. 5A illustrates a plurality of arms and their respective confidence intervals during one embodiment of an exploration phase of a plurality of arms. In particular, the content testing system 102 determines (e.g., via a BAI algorithm that uses adaptive sampling, such as KL-LUCB) that a first arm 500 is a current leader arm based on a sampling value (or upper confidence bound) for the first arm 500 being the highest. Additionally, the content testing system 102 can determine a closest challenger of the first arm 500 based on confidence intervals (i.e., the arrow ranges representing an upper confidence bound and a lower confidence bound) of other arms in the dimension. To illustrate, the content testing system 102 can determine that a second arm 502 with a highest upper confidence bound (second to the upper confidence bound of the first arm 500) is the closest challenger. When the content testing system 102 determines that the confidence interval of the challenger no longer overlaps with the confidence interval of the leader, the content testing system 102 stops and selects the leader.

FIG. 5B illustrates a plurality of arms and their respective confidence intervals during another embodiment of an exploration phase of a plurality of arms. Specifically, the content testing system 102 determines (e.g., via a BAI algorithm that uses a racing strategy, such as KL-Racing) that a first arm 504 is an empirical leader of the plurality of arms. In particular, the content testing system 102 can identify the empirical leader based on the confidence interval of the empirical leader having a highest upper confidence bound. The content testing system 102 can then analyze, during each round, a plurality of arms remaining (e.g., uniformly) and then eliminate any arms having confidence intervals that no longer overlap with the confidence interval of the empirical leader. To illustrate, the content testing system 102 can eliminate a second arm 506 with an upper confidence bound that is lower than the lower confidence bound of the empirical leader (i.e., the confidence interval of the second arm 506 does not overlap with that of the first arm 504).

While the above examples describe BAI algorithms that use adaptive sampling or racing strategies, the content testing system 102 can use other methods of determining a leader arm. In any case the content testing system 102 utilizes, for testing iteratively and alternately in each dimension, a BAI algorithm capable of determining a leader arm from a plurality of arms (i.e., combinations) in a matrix. The content testing system 102 then uses the identified leader arms from each dimension to determine a single combination with the highest sampling value based on the averaged reward data for the plurality of rows/columns in the matrix. Finally, the content testing system 102 can execute the digital campaign at a larger scale by sending digital content to a plurality of recipient s in accordance with the parameters for the selected combination.

The above description provides a simplified overview of the process of determining a best combination of a plurality of combinations in a multi-dimensional matrix without testing every possible combination. The description provided below provides a more detailed analysis of the problem and the solution. Specifically, the below description provides algorithms and proofs for the process, in addition to analysis of data that illustrates the benefits of the iterative/alternating dimension exploration process described herein.

In particular, in one or more embodiments, the content testing system 102 attempts to learn a maximum entry of a stochastic rank-one matrix with a probability of error not larger than $\delta > 0$. The content testing system 102 utilizes a black-box algorithm for solving a multi-dimensional matrix problem as described herein, Algorithm 1 below is also referred to as "R1-BAI" (i.e., rank-one best-arm identification). The content testing system 102 uses the R1-BAI algorithm to solve, simultaneously (or substantially simultaneously), row and column BAI problems to learn the best row and column on average. The content testing system 102 bounds the regret of R1-BAI as a function of the BAI. The below description proves a matching lower bound, which illustrates that the design of R1-BAI is near optimal.

For purposes of the following description, for any integer $d > 0$, $[d] := \{1, \ldots, d\}$. Moreover, for $(x,y) \in \in [0,1]^2$, the Kullback-Leibler (KL) divergence between Bernoulli random variables $\mathcal{B}(x)$ and $\mathcal{B}(y)$ is denoted by $$d(x, y) = x\log\left(\frac{x}{y}\right) + (1 - x)\log\left(\frac{1-x}{1-y}\right).$$

Furthermore, row-related quantities are indexed by (0) and column-related quantities are indexed by (1).

An instance of a rank-one BAI problem is a tuple $(K^{(0)}, K^{(1)}, P_{(0)}, P_{(1)})$, where $K^{(0)}$ denotes the number of rows, $K^{(1)}$ denotes the number of columns, $P_{(0)}$ is a probability distribution over a unit hypercube $[0,1]^{K^{(1)}}$, and $P_{(1)}$ is a probability distribution over a unit hypercube $[0,1]^{K^{(1)}}$.

An action at round $t=1, 2, \ldots$ is a tuple $A_t=(i_t,j_t)$ that depends on past observations and induces a reward $X_t(i_t,j_t)=u_t(i_t)v_t(j_t)$, where $u_t$ and $v_t$ are independent random vectors drawn from $P_{(0)}$ and $P_{(1)}$, respectively. Note that the reward associated with $A_t$ is the product of the independent, but unobserved, rewards associated with the selected row and column. The content testing system 102 does not observe the individual random variables $u_t(i_t)$ and $v_t(j_t)$ corresponding to each part of its action but only observes the one entry $(i_t,j_t)$ of the rank-one matrix $u_t^T v_t$. Additionally, two vectors containing the $K^{(0)}+K^{(1)}$ parameters of the problem, $$E[u_t] = \bar{u}, E[v_t] = \bar{v}$$

are denoted as $\bar{u} \in [0,1]^{K^{(0)}}$ and $\bar{v} \in [0,1]^{K^{(1)}}$.

Furthermore, without loss of generality, the content testing system 102 assumes that the rows and columns are indexed in decreasing order of their means, and that there exists a unique optimal arm $\bar{u}(1) > \bar{u}(2) \geq \ldots \geq \bar{u}(K^{(0)})$ and $\bar{v}(1) > \bar{v}(2) \geq \ldots \geq \bar{v}(K^{(1)})$ so that $A^* = (1,1)$.

Additionally, the process described herein also defines gaps independently for rows $i \geq 2$ and columns $j \geq 2$, $$\Delta^{(0)}(i) = \bar{u}(1) - \bar{u}(i), \Delta^{(1)}(j) = \bar{v}(1) - \bar{v}(j).$$

In particular, the learning problem in the fixed-confidence setting can be defined as follows: A risk parameter $\delta > 0$ is fixed and the learner is required to be $\delta$-correct: the learner outputs $\hat{A}_\tau$ after a (random) stopping time $\tau$ such that $\mathbb{P}(\hat{A}_\tau \neq A^*) \leq \delta$ while keeping the sample complexity $\tau$ as small as possible.

In one or more embodiments, the content testing system 102 uses the R1-BAT to leverage the structure of non-negative rank-one matrices to independently learn the best row and column on average. In particular, the content testing system 102 uses a black-box BAI algorithm (e.g., any suitable BAI algorithm) to learn the best row arm while averaging over columns, and the best column arm while averaging over rows. The black box algorithm, referred to as BAI, can be any BAI algorithms described above. The content testing system 102 uses the R1-BAT to take advantage of existing exploration algorithms while providing additional efficiencies for allowing fast and efficient multivariate digital content testing. Algorithm 1 (R1-BAT) is represented as:

Algorithm 1 (R1-BAT): A unified approach to rank-one BAI.

```
1:  input: Base algorithm BAI^(p) for each dimension; risk δ > 0 or a budget T
2:  t ← 1                                                      ▷Initialization
3:  for p = 0,1 do
4:      stop^(p) ← 0                         ▷Indicator of stopping in dimension p
5:      Choose uniformly at random j ∈ [K^(1-p)]
6:      for all i ∈ [K^(p)] do N_i^(p) ← 1, C_i^(p) ← X_t(i,j), t ← t + 1    ▷Pull each arm (i,j) once
7:  while (stop^(0) = 0) or (stop^(1) = 0) do
8:      for p = 0,1 do                      ▷Alternating exploration over both dimensions
9:          if stop^(0) = 0 then
10:             (S, stop^(p)) ← BAI^(p) (N^(p), C^(p)),
11:             where S are next arms to pull and stop^(p) is the indicator of stopping
12:         if stop^(p) = 1 then
13:             Â(p) ← argmax_{i∈[K^(p)]} C_i^(p)/N_i^(p)           ▷Choose best arm in dimension p
14:         else
15:             Choose uniformly at random j ∈ [K^(1-p)]
16:             for all i ∈ S do
17:                 N_i^(p) ← N_i^(p) + 1, C_i^(p) ← C_i^(p) + X_t(i,j), t ← t + 1    ▷Pull each arm (i,j)
18:  return: Â(1), Â(2)
```

As illustrated in Algorithm 1 above, the content testing system 102 iterates between row and column BAI problems (i.e., line 8 in Algorithm 1), which correspond to p=0 and p=1, respectively. Dimension 0 corresponds to rows and dimension 1 corresponds to columns. Indexing in the active dimension is by i. Indexing in the other dimension is by j. At the beginning of the row phase, for example, the content testing system 102 calls the row base algorithm $BAI^{(p)}$ (line 10) and obtains the rows to test $S$ and the stopping indicator $stop^{(0)}$. If the row BAI problem is not solved, $stop^{(0)}=0$, and the algorithm continues to explore all rows $S$. In particular, the algorithm chooses a random column j (line 15) and observes all rows $S$ over the selected column (lines 16 and 17). The cumulative reward of row i and the number of observations of row i are stored in $C_i^{(p)}$ and $N_i^{(p)}$, respectively. The content testing system 102 then proceeds to the column phase, which is analogous to the row phase, with the roles of rows and columns exchanged.

In accordance with algorithm 1, the content testing system 102 maintains statistics of the arms that are dimension-dependent, such that the counts $C^{(p)}$ and $N^{(p)}$ of dimensions $p \in [0,1]$ are only updated during their respective exploration phases. Accordingly, the content testing system 102 behaves as if two parallel one-dimensional BAI algorithms were running at the same time on both dimensions of the matrix. Thus, the description above with respect to the row exploration is similar to the column exploration.

At the beginning of a row exploration phase, the content testing system 102 provides the counts $C^{(0)}$ and $N^{(0)}$ as inputs to a BAI algorithm. As mentioned, two primary types of such exploration strategies include adaptive sampling with KL-LUCB and sequential elimination with KL-Racing. KL-LUCB explores only the leader and its best challenger but does not eliminate arms. KL-Racing maintains a list of remaining arms and explores the remaining arms in a round-robin fashion at each call.

Furthermore, as illustrated in line 15 of Algorithm 1, the content testing system 102 performs cross-exploration of dimensions uniformly at random. While such is an option, the content testing system 102 can also replace line 15 of Algorithm 1 with a heuristic that improves on R1-BAT by optimizing the cross-exploration rule, resulting in R1-BAT+. Accordingly, line 15 is replaced with an adaptive choice for each row to be explored in lines 16-17. In particular, the content testing system 102 maintains statistics for each entry (i,j) of the matrix $N^{(p)}[i,j]$ and $C^{(p)}[i,j]$ for $p \in \{0,1\}$. Indeed, the aggregated counts become $N_i^{(p)}=\Sigma_j N^{(p)}[i,j]$ and $C_i^{(p)}=\Sigma_j C^{(p)}[i,j]$. The loops in line 16-17 become:

for all $i \in S$ do $$j \leftarrow KL-UCB(N^{(p)}[i,:], C^{(p)}[i,:])$$

$$N_i^{(p)} \leftarrow N_i^{(p)}+1, C_i^{(p)} \leftarrow C_i^{(p)}+X_t(i,j), t \leftarrow t+1$$

When the sampling is uniform, the content testing system 102 sequentially and independently solves the BAI problem on each dimension of the problem. This is because no information on dimension 1-p is used when exploring dimension p and provides a theoretical foundation for the effectiveness of Algorithm 1 by bounding the sample complexity. In contrast, the above replacements for the algorithm leverage the information on the other dimension. Specifically, KL-UCB samples the leader entry with high probability, leading to a higher reward in expectation.

As described in relation to FIG. 4A-4D, FIGS. 5A-5B, and Algorithm 1, the content testing system 102 can thus sample within separate dimensions, using a rank-one matrix assumption, to determine highest sampling values within each dimension. The content testing system 102 can also use the highest sampling values within each dimension to determine the combination with the highest sampling value of the rank-one matrix. Accordingly, the acts and algorithms illustrated and described above in relation to FIGS. 4A-4D, FIGS. 5A-5B, and Algorithm 1 can provide the corresponding structure for various embodiments of a step for sampling in a plurality of dimensions using a best-arm identification algorithm and a rank-one matrix assumption to determine a combination of a parameter of the first parameter set and a parameter of the second parameter set, the combination comprising a highest sampling value within a tolerance.

Because R1-BAI is a meta-algorithm (i.e., an algorithm that uses other algorithms to perform operations within the algorithm), its performance depends directly on the performance of the chosen BAI algorithm. The description hereafter describes the link between both, provided that the BAI is "acceptable," as defined below.

An "acceptable" black-box BAI algorithm for R1-BAI must be able to solve a standard, one-dimensional BAI problem. Concretely, in a fixed-confidence setting with risk $\delta$, there is an appropriate choice of algorithm parameters such that BAI is $\delta$-correct, and if it is run with these parameters on a one-dimensional BAI problem $(\theta_1, \ldots, \theta_K)$, then its sample complexity is bounded either in expectation or with high probability by $$O\left(\log\left(\frac{1}{\delta}\right) H^{BAI}(\delta, \theta_1, \ldots, \theta_K)\right)$$

where $H^{BAI}$ is an algorithm-dependent function of the parameters of the problem. R1-BAI is $\delta$-correct if run with an acceptable BAI. As illustrated below, KL-Racing and KL-LUCB are acceptable BAI algorithms for R1-BAI.

Experimental data for empirically validating theoretical properties of R1-BAI and improvement brought by R1-BAI+ for KL-LUCB and KL-Racing are discussed below. The exploration rate used in the experiments for any of the BAI algorithms is $\beta(\delta,t)=\log(\log(t)+1)/\delta$ because this exploration rate gives the best empirical performance and remains over conservative in practice. The risk is fixed to $\delta=0.1$.

In one or more embodiments, the content testing system 102 performed experiments on synthetic data. Specifically, the experiments highlight the empirical gain in performance of the structure-aware algorithms R1-BAI+ and R1-BAI as compared to using BAI algorithms in structure-agnostic fashion on $K^{(0)}K^{(1)}$ arms. For that purpose, $K^{(0)}=K^{(1)}=K$, K varies in $\{8, 16, 32, 64\}$, and generate rank-one matrices $\overline{u}\overline{u}^T$ with $\overline{u}=(0.7, 0.2, \ldots, 0.2) \in [0,1]^{K^{(0)}}$. For each matrix, the content testing system 102 ran both R1-BAI+ and R1-BAI with both KL-Racing and KL-LUCB.

Figure 6B:
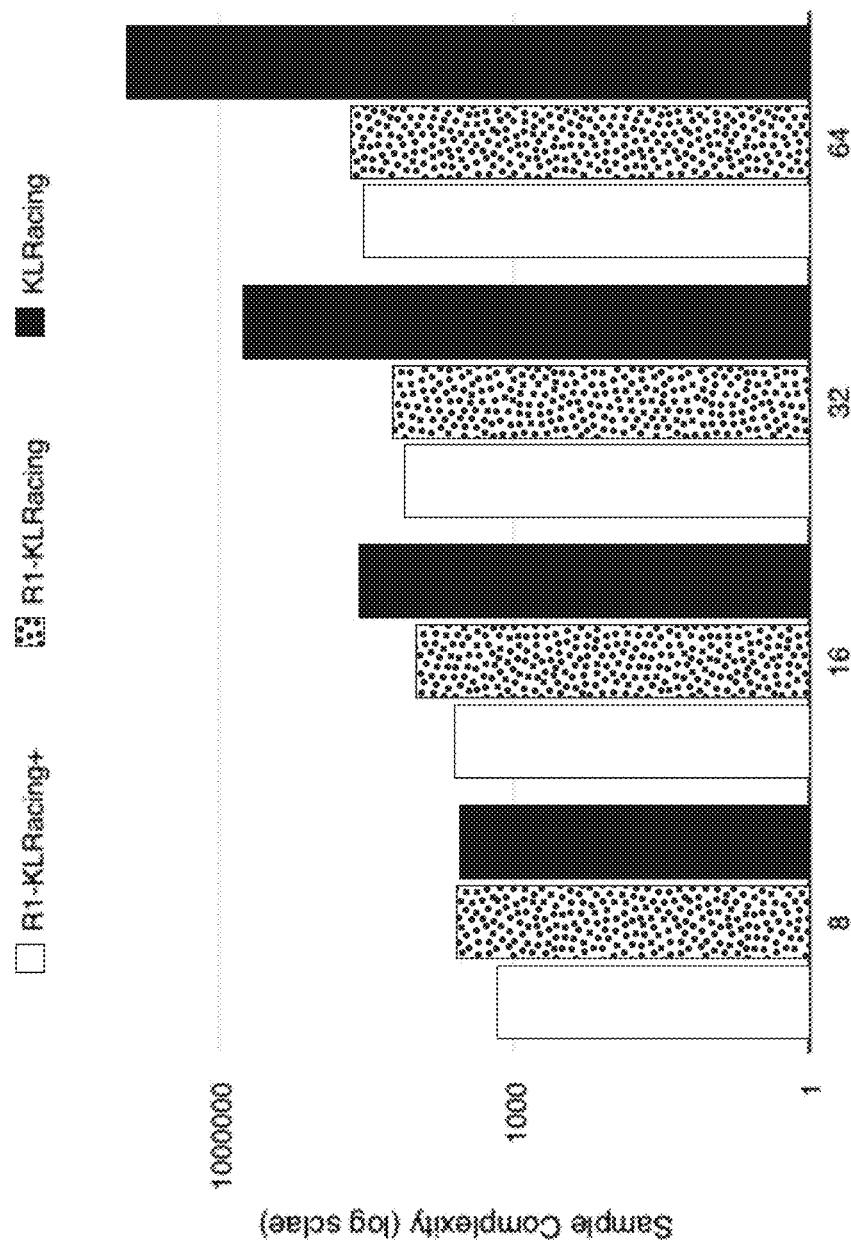

FIGS. 6A-6B illustrate the sample complexities for the selected algorithms. For BAI=KL-LUCB, the results of structure-agnostic KL-LUCB grow as $K^2$, while the results grow linearly for KL-LUCB in the rank-one assumption. KL-LUCB is a sample efficient baseline, however. As illustrated in FIG. 6A, the improvement due to R1-BAI is primarily observable when $K \geq 16$. In contrast, for BAI=KL-Racing, the results in FIG. 6B are plotted on a log-scale because the performance of KL-Racing in the rank-one assumption is an order of magnitude better than KL-Racing in the structure-agnostic scenario.

Figure 7:
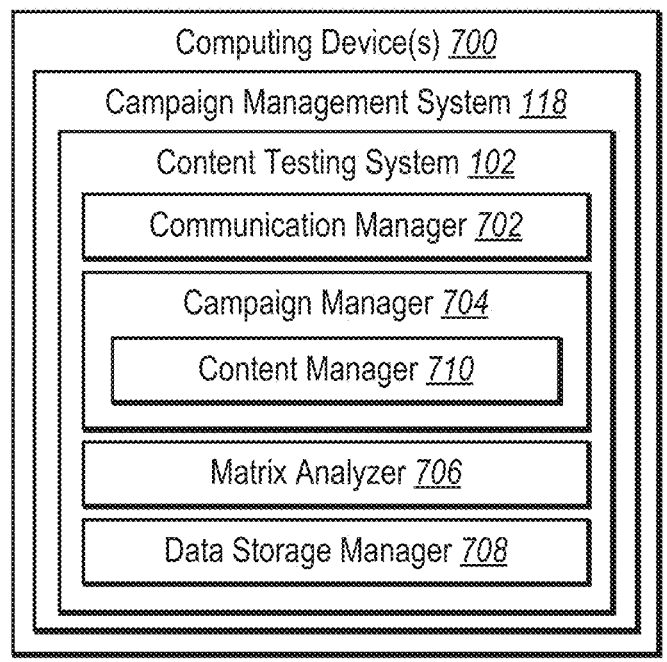
FIG. 7 illustrates a schematic diagram of the content testing system of FIG. 1 in accordance with one or more embodiments.

FIG. 7 illustrates a detailed schematic diagram of an embodiment of the content testing system 102 of FIG. 1. As shown, the content testing system 102 can be part of computing device(s) 700. Additionally, the content testing system 102 can include, but is not limited to, a communication manager 702, a campaign manager 704, a matrix analyzer 706, and a data storage manager 708. The content testing system 102 can be implemented on any number of computing devices (e.g., the server device(s) 106 and/or the administrator client device 104 of FIG. 1). For example, the content testing system 102 can be implemented in a distributed system of server devices for testing and evaluating digital content in digital campaigns. Alternatively, the content testing system 102 can be implemented on a single computing device such as the administrator client device 104 of FIG. 1.

In one or more embodiments, each of the components of the content testing system 102 are in communication with one another using any suitable communication technologies. Additionally, the components of the content testing system 102 can be in communication with one or more other devices including the administrator client device 104 and the user client devices 108a, 108b, as illustrated in FIG. 1. It will be recognized that although the components of the content testing system 102 are shown to be separate in FIG. 7, any of the subcomponents may be combined into fewer components, such as into a single component, or divided into more components as may serve a particular implementation. Furthermore, although the components of FIG. 7 are described in connection with the content testing system 102, at least some of the components for performing operations in conjunction with the content testing system 102 described herein may be implemented on other devices within the environment.

The components of the content testing system 102 can include software, hardware, or both. For example, the components of the content testing system 102 can include one or more instructions stored on a computer-readable storage medium and executable by processors of one or more computing devices (e.g., the computing device(s) 700). When executed by the one or more processors, the computer-executable instructions of the content testing system 102 can cause the computing device(s) 700 to perform the content testing and evaluating methods described herein. Alternatively, the components of the content testing system 102 can comprise hardware, such as a special purpose processing device to perform a certain function or group of functions. Additionally, or alternatively, the components of the content testing system 102 can include a combination of computer-executable instructions and hardware.

Furthermore, the components of the content testing system 102 performing the functions described herein with respect to the content testing system 102 may, for example, be implemented as part of a stand-alone application, as a module of an application, as a plug-in for applications including marketing applications, as a library function or functions that may be called by other applications, and/or as a cloud-computing model. Thus, the components of the content testing system 102 may be implemented as part of a stand-alone application on a personal computing device or a mobile device. Alternatively, or additionally, the components of the content testing system 102 may be implemented in any application that allows campaign and content management, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are registered trademarks of Adobe Systems Incorporated in the United States and/or other countries.

As mentioned, the content testing system 102 can include a communication manager 702 to facilitate the management of communications with one or more external devices. For example, the communication manager 702 can allow the content testing system 102 to communicate with other devices associated with marketing entities (e.g., administrator client device 104 of FIG. 1), devices of recipients of campaign content (e.g., user client devices 108a, 108b), content databases, or other devices or systems. The communication manager 702 can thus allow the content testing system 102 to receive and provide data in connection with analyzing and testing digital content, and for executing digital campaigns and obtaining response data for the digital campaigns.

The content testing system 102 can also include a campaign manager 704 to facilitate the management of a plurality of digital campaigns. Specifically, the campaign manager 704 can manage one or more campaigns for one or more entities. The campaign manager 704 can associate a digital campaign with an entity by associating a campaign identifier with the entity. Thus, the campaign manager 704 can track a plurality of campaigns for a plurality of entities while maintaining response data and other collected information separately for each digital campaign.

The campaign manager 704 also includes a content manager 710 that facilitates the management of digital content for digital campaigns. For example, the content manager 710 can manage a plurality of versions of digital content for a digital campaign. The content manager 710 may access the digital content from a content database associated with a marketing entity and then use the digital content to test and/or execute a digital campaign. Additionally, the content manager 710 can track the use of digital content during the testing phases using content identifiers and collect response data for each tested version of digital content. The campaign manager 704 and the content manager 710 can provide collected response data to one or more other components of the content testing system 102 for use in determining digital content to use in executing a digital campaign.

The content testing system 102 can further include a matrix analyzer 706 that performs the rank-one matrix exploration processes described previously. In particular, the matrix analyzer 706 can alternately explore rows and columns of a matrix to test/sample and evaluate combinations of parameters of a digital campaign. The matrix analyzer 706 can estimate highest sampling values for each dimension of the matrix based on the tested combinations and then use the highest sampling values to determine a combination with a highest sampling value in the matrix. The matrix analyzer 706 can also communicate with other components of the content testing system 102 to obtain and provide information for use in the exploration phases.

The content testing system 102 also includes a data storage manager 708 (that comprises a non-transitory computer memory) that stores and maintains data associated with digital campaign management and analysis of campaign parameters. For example, the data storage manager 708 can include a database that stores identifiers for one or more versions of digital content, digital campaigns, and marketing entities. Additionally, the data storage manager 708 can store information associated with recipients of campaign content including response data from the recipients for different parameters of a digital campaign.

Figure 8:
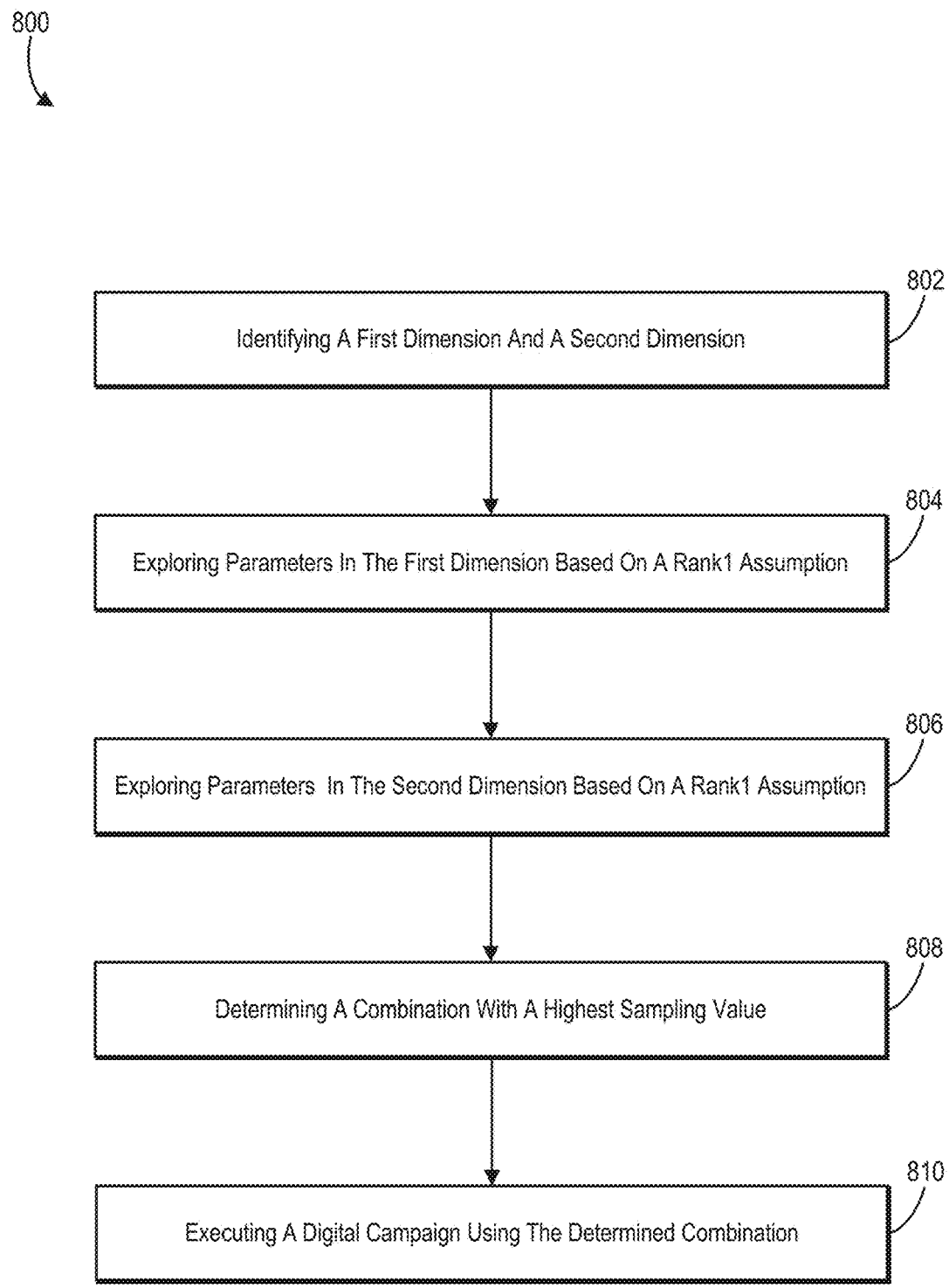
FIG. 8 illustrates a flowchart of a series of acts in a method of determining parameters for digital campaign content for executing digital campaigns in accordance with one or more embodiments.

Turning now to FIG. 8, this figure illustrates a flowchart of a series of acts 800 of determining parameters for digital campaign content for executing digital campaigns. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

The series of acts 800 includes an act 802 of identifying a first dimension and a second dimension. For example, act 802 involves identifying a first dimension comprising a first parameter set for a digital campaign and a second dimension comprising a second parameter set for the digital campaign. In one or more embodiments, the first parameter set defines a version of digital content for use in the digital campaign. In one or more embodiments, the second parameter set defines a target audience segment for executing the digital campaign. Together the first and second dimensions can define a parameter matrix of possible parameter combinations for the digital campaign.

The series of acts 800 also includes an act 804 of exploring parameters in the first dimension. For example, act 804 involves exploring parameters in the first dimension using a rank-one matrix assumption to estimate a highest sampling value in the first dimension. Act 804 can involve selecting a column of a plurality of columns, and exploring parameters for a plurality of combinations based on the randomly selected column and a plurality of rows based on the rank-one assumption. In one or more embodiments, act 804 further involves using a BAI algorithm in combination with the rank-one assumption to intelligently explore the parameters. Additionally, act 804 can involve determining a leader row of the plurality of rows based on previously sampled data in the second dimension. Act 804 can then involve exploring, in response to determining the leader row of the plurality of rows, parameters for a combination from the leader row in the first dimension. In other words, act 804 can involve determining if the best row has been found, if so, act 804 moves on to act 806. If the best row has not been found, act 804 can involve querying the BAI algorithm to determine which rows to explore. Act then 804 explores the rows over a random or otherwise selected column.

Act 804 can involve generating digital content corresponding to a combination comprising a randomly selected parameter of the second parameter set and a parameter of the first parameter set. Additionally, act 804 can involve sending, to a plurality of client devices, the generated digital content in accordance with the combination. Act 804 can then involve determining, for the generated digital content, response data from the plurality of client devices.

Act 804 can further involve storing, for a row of the plurality of rows, cumulative reward data for combinations in the row, the cumulative reward data being based on response data for the combinations in the row. Additionally, act 804 can involve generating an averaged reward value for the row of the plurality of rows based on the cumulative reward data for combinations in the row and a number of observations in the row. Act 804 can then involve estimating the highest sampling value in the first dimension based on averaged reward values for a plurality of rows in the first dimension.

The series of acts 800 can further involve randomly selecting a second column of the plurality of columns, and exploring response data for a plurality of combinations corresponding to the randomly selected second column. The series of acts 800 can then involve updating the cumulative reward data and the averaged reward value for the row of the plurality of rows.

Additionally, the series of acts 800 includes an act 806 of exploring parameters in the second dimension. For example, act 806 involves exploring parameters in the second dimension using the rank-one matrix assumption to estimate a highest sampling value in the second dimension. Act 806 can involve initially randomly selecting a row of a plurality of rows in the parameter matrix, and exploring parameters for a plurality of combinations based on the randomly selected row and a plurality of columns in the parameter matrix. Furthermore, act 806 can involve exploring parameters based on the rank-one assumption and a best-arm identification algorithm. In other words, act 806 can involve determining if the best column has been found, if so, act 806 moves on to act 808. If the best row has not been found, act 806 can involve querying the BAI algorithm to determine which columns to explore. Act then 806 explores the columns over a random or otherwise selected row.

Act 806 can involve generating digital content corresponding to a combination comprising a randomly selected parameter of the first parameter set and a parameter of the second parameter set. Additionally, act 806 can involve sending, to a plurality of client devices, the generated digital content in accordance with the combination. Act 806 can then involve determining, for the generated digital content, response data from the plurality of client devices.

Act 806 can further involve storing, for a column of the plurality of columns, cumulative reward data for combinations in the columns, the cumulative reward data being based on response data for the combinations in the column. Additionally, act 804 can involve generating an averaged reward value for the column of the plurality of columns based on the cumulative reward data for combinations in the column and a number of observations in the column. Act 804 can then involve estimating the highest sampling value in the second dimension based on averaged reward values for a plurality of columns in the second dimension.

The series of acts 800 can further involve selecting a second row of the plurality of rows in the parameter matrix, and exploring response data for a plurality of combinations corresponding to the randomly selected second row. The series of acts 800 can then involve updating the cumulative reward data and the averaged reward value for the column of the plurality of columns.

As part of acts 804 and 806, or as an additional act, the series of acts 800 can include alternatively exploring parameters in the first dimension and parameters in the second dimension, wherein the first dimension corresponds to a row vector and the second dimension corresponds to a column vector. For example, the series of acts 800 can include utilizing a best-arm identification algorithm and the rank-one assumption to sequentially eliminate rows from future exploration while exploring in the first dimension and eliminating columns for future exploration while exploring in the second dimension. Alternatively, the series of acts 800 can include utilizing a best-arm identification algorithm that selects, while exploring in a selected dimension of the first dimension and the second dimension, a leading combination and a closest competitor combination based on confidence intervals for a plurality of combinations in the selected dimension.

The series of acts 800 further includes an act 808 of determining a combination with a highest sampling value in a parameter matrix. For example, act 808 involves determining, based on the estimated highest sampling value in the first dimension and the estimated highest sampling value in the second dimension, a combination comprising one parameter of the first parameter set and one parameter of the second parameter set with a highest sampling value. Act 808 can involve determining the combination with the highest sampling value in the parameter matrix according to a predetermined risk level or a predetermined testing budget.

Act 808 can further involve analyzing a plurality of combinations within a selected dimension of the first dimension and the second dimension until meeting a stopping rule. Act 808 can then involve determining a leader combination in the selected dimension in response to meeting the stopping rule. Act 808 can also involve determine the combination with the highest sampling value in the rank-one matrix based on the determined leader combination in the selected dimension.

The series of acts 800 also includes an act 810 of executing a digital campaign using the determined combination. For example, act 810 involves executing the digital campaign by providing, to a plurality of client devices, digital content using the determined combination with the highest sampling value.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
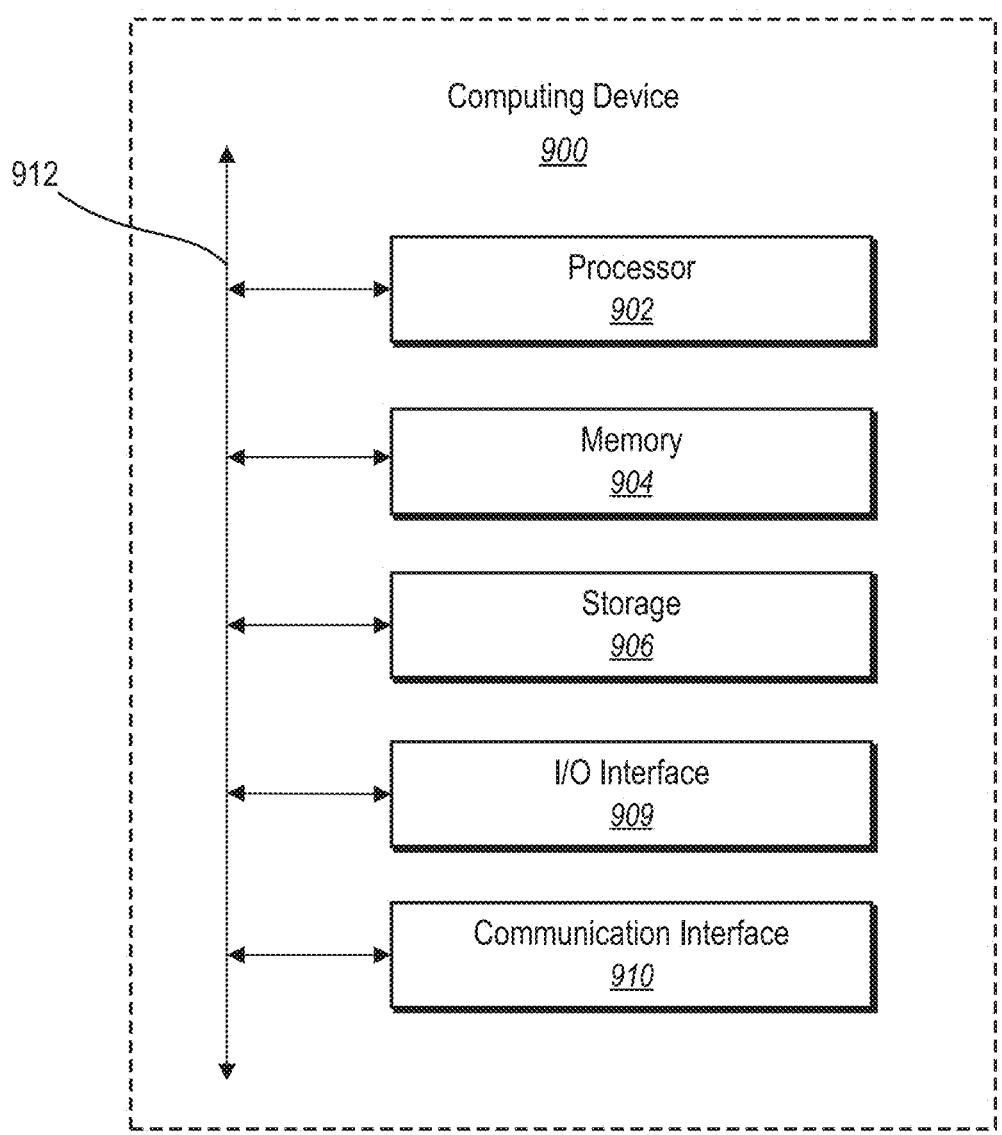
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the content testing system 102. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:

alternately explore combinations of parameters of a first dimension and a second dimension via a plurality of instances of a best-arm identification algorithm, each instance comprising a separate bounded sampling complexity and a separate fixed confidence setting by:
sampling values for the combinations from response data received from client devices in response to content corresponding to the combinations; and
determining an estimated highest sampling value in the first dimension and an estimated highest sampling value in the second dimension based on the response data;

determine, based on the estimated highest sampling value in the first dimension and the estimated highest sampling value in the second dimension, an estimated highest sampling value combination; and provide, to a plurality of client devices, digital communications comprising content based on the estimated highest sampling value combination.

2. The non-transitory computer readable storage medium as recited in claim 1, further comprising instructions that, when executed by the at least one processor, cause the computing device to alternately explore the combinations of the parameters in the first dimension and the second dimension by:

exploring a first parameter set of the first dimension over a second parameter set of the second dimension by executing a first instance of the best-arm identification algorithm; and exploring the second parameter set of the second dimension over the first parameter set of the first dimension by executing a second instance of the best-arm identification algorithm.

3. The non-transitory computer readable storage medium as recited in claim 2, further comprising instructions that, when executed by the at least one processor, cause the computing device to:

explore the first dimension utilizing the first instance of the best-arm identification algorithm according to a first bounded sampling complexity and a first fixed confidence setting; and explore the second dimension utilizing the second instance of the best-arm identification algorithm according to a second bounded sampling complexity and a second fixed confidence setting.

4. The non-transitory computer readable storage medium as recited in claim 3, further comprising instructions that, when executed by the at least one processor, cause the computing device to execute the second instance of the best-arm identification algorithm after executing the first instance of the best-arm identification algorithm to determine the estimated highest sampling value in the first dimension.

5. The non-transitory computer readable storage medium as recited in claim 1, further comprising instructions that, when executed by the at least one processor, cause the computing device to:

determine the estimated highest sampling value combination by:

determining a version of content from a first parameter set corresponding to the first dimension; and determining an audience segment from a second parameter set corresponding to the second dimension; and provide a digital communication comprising the version of content to a set of client devices corresponding to the audience segment.

6. The non-transitory computer readable storage medium as recited in claim 1, further comprising instructions that, when executed by the at least one processor, cause the computing device to sample the values for the combinations by:

sending, to one or more sets of client devices, content corresponding to a combination of a first parameter of the first dimension and a second parameter of the second dimension; and receiving data from the one or more sets of client devices in response to the content corresponding to the combination of the first parameter and the second parameter.

7. The non-transitory computer readable storage medium as recited in claim 1, further comprising instructions that, when executed by the at least one processor, cause the computing device to execute the plurality of instances of the best-arm identification algorithm to perform sequential elimination of rows and columns in a rank-one matrix comprising the first dimension and the second dimension by:

eliminating rows from future exploration while exploring in the first dimension; and eliminating columns from future exploration while exploring in the second dimension.

8. The non-transitory computer readable storage medium as recited in claim 7, further comprising instructions that, when executed by the at least one processor, cause the computing device to:

randomly select a column of a plurality of columns while exploring in the first dimension; and explore, by executing a first instance of the best-arm identification algorithm, parameters for a plurality of combinations based on the randomly selected column and a plurality of rows within a bounded sampling complexity and a fixed confidence setting for the first instance.

9. The non-transitory computer readable storage medium as recited in claim 8, further comprising instructions that, when executed by the at least one processor, cause the computing device to alternately explore the combinations of the parameters of the first dimension and the second dimension by:

generating averaged reward values for a row based on cumulative reward data of sampled rows for combinations explored in the first dimension; and estimate a highest sampling value in the first dimension based on averaged reward values for a plurality of rows in the first dimension.

10. A system comprising:

one or more memory devices comprising a best-arm identification algorithm that explores parameters in a plurality of dimensions of a rank-one matrix via a plurality of instances of the best-arm identification algorithm; and one or more servers configured to cause the system to:

alternately explore combinations of the parameters of the plurality of dimensions via the plurality of instances of the best-arm identification algorithm, each instance comprising a separate bounded sampling complexity and a separate fixed confidence setting by:

receiving response data from one or more sets of client devices in response to content based on the combinations of the parameters sent to the one or more sets of client devices; and determining estimated highest sampling values in the plurality of dimensions based on the response data;

determining an estimated highest sampling value combination for the plurality of dimensions based on the estimated highest sampling values; and providing, to a plurality of client devices, digital communications comprising content based on the estimated highest sampling value combination.

11. The system as recited in claim 10, wherein the one or more servers are configured to cause the system to determine the estimated highest sampling values in the plurality of dimensions by:

determining an estimated highest sampling value in a first dimension of the plurality of dimensions by utilizing a first instance of the plurality of instances of the best-arm identification algorithm, the first instance comprising a first bounded sampling complexity and a first fixed confidence; and determining an estimated highest sampling value in a second dimension of the plurality of dimensions by utilizing a second instance of the plurality of instances of the best-arm identification algorithm, the second instance comprising a second bounded sampling complexity and a second fixed confidence.

12. The system as recited in claim 11, wherein the one or more servers are configured to cause the system to:

execute the first instance of the best-arm identification algorithm to sample a plurality of values in the first dimension during exploration of the first dimension; and execute the second instance of the best-arm identification algorithm to sample a plurality of values in the second dimension during exploration of the second dimension.

13. The system as recited in claim 12, wherein the one or more servers are configured to cause the system to:

receive response data from the one or more sets of client devices by receiving indications of interactions with the digital communications at the one or more sets of client devices; and determine an estimated highest sampling value in the first dimension by estimating, utilizing the first instance of the best-arm identification algorithm, interactions for corresponding to combinations of a parameter in the first dimension over randomly sampled parameters in the second dimension.

14. The system as recited in claim 13, wherein the one or more servers are configured to cause the system to explore parameters of the first dimension over one or more parameters of the second dimension by:

sending a plurality of digital communications comprising content based on a parameter in the first dimension to a plurality of sets of client devices in audience segments based on a plurality of parameters in the second dimension; and receiving, from the plurality of sets of client devices, response data comprising indications of interactions with the plurality of digital communications.

15. The system as recited in claim 13, wherein the one or more servers are configured to cause the system to determine the estimated highest sampling value in the first dimension by utilizing the first instance of the best-arm identification algorithm to select, while exploring in the first dimension, the estimated highest sampling value from a leading combination of parameters and a closest competitor combination based on confidence intervals for a plurality of combinations in the first dimension according to a bounded sampling complexity and fixed confidence setting for the first instance of the best-arm identification algorithm.

16. The system as recited in claim 13, wherein the one or more servers are configured to cause the system to determine the estimated highest sampling value in the first dimension by utilizing the first instance of the best-arm identification algorithm to eliminate one or more vectors from future exploration while exploring in the first dimension based on confidence intervals for a plurality of combinations in the first dimension according to a bounded sampling complexity and fixed confidence setting for the first instance of the best-arm identification algorithm.

17. The system as recited in claim 11, wherein the one or more servers are configured to cause the system to explore the combinations of parameters of the first dimension over parameters in the second dimension by:

determining, for a vector of a plurality of vectors in the first dimension, cumulative reward data for combinations in the vector based on the response data;

generating an averaged reward value for the vector based on the cumulative reward data for the vector; and estimating the highest sampling value in the first dimension based on averaged reward values for the plurality of vectors in the first dimension.

18. A computer-implemented method comprising:

exploring, via a plurality of instances of a best-arm identification algorithm, combinations of parameters in a plurality of dimensions of a rank-one matrix by:

sending content to one or more sets of client devices based on the combinations of parameters; and estimating highest sampling values in the plurality of dimensions based on response data received from the one or more sets of client devices according to separate bounded sampling complexities and separate fixed confidence settings for the plurality of dimensions;

determining a parameter combination with an estimated highest sampling value based on the estimated highest sampling values in the plurality of dimensions; and providing content corresponding to the parameter combination with the estimated highest sampling value to a plurality of client devices.

19. The computer-implemented method as recited in claim 18, wherein sending content to the one or more sets of client devices based on the combinations of parameters comprises:

generating a digital communication comprising digital content corresponding to a parameter of a first dimension of the plurality of dimensions;

determining an audience segment corresponding to a randomly sampled parameter of a second dimension of the plurality of dimensions; and sending the digital communication to a plurality of client devices corresponding to the audience segment.

20. The computer-implemented method as recited in claim 18, further comprising determining a fixed confidence setting for a dimension of the plurality of dimensions based on a risk level and a sampling budget in connection with an instance of the plurality of instances of the best-arm identification algorithm.

* * * * *